United States Patent
Wang et al.

(10) Patent No.: US 12,351,704 B2
(45) Date of Patent: Jul. 8, 2025

(54) USE OF RECYCLED POLYETHYLENE IN CLOSURES FOR BOTTLES

(71) Applicant: NOVA Chemicals (International) S.A., Fribourg (CH)

(72) Inventors: XiaoChuan Wang, Calgary (CA); Brant Wunderlich, Calgary (CA); Derek Wasylenko, Calgary (CA); Tony Tikuisis, Calgary (CA); Gilbert Arnould, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 288 days.

(21) Appl. No.: 17/766,679

(22) PCT Filed: Oct. 13, 2020

(86) PCT No.: PCT/IB2020/059603
§ 371 (c)(1),
(2) Date: Apr. 5, 2022

(87) PCT Pub. No.: WO2021/074785
PCT Pub. Date: Apr. 22, 2021

(65) Prior Publication Data
US 2024/0093007 A1 Mar. 21, 2024

Related U.S. Application Data

(60) Provisional application No. 62/915,730, filed on Oct. 16, 2019.

(51) Int. Cl.
*C08L 23/06* (2006.01)

(52) U.S. Cl.
CPC .......... *C08L 23/06* (2013.01); *C08L 2203/10* (2013.01); *C08L 2205/025* (2013.01);
(Continued)

(58) Field of Classification Search
CPC ............... C08L 23/06; C08L 2205/025; C08L 2207/20; C08L 2203/10
See application file for complete search history.

(56) References Cited

U.S. PATENT DOCUMENTS 3,645,992 A 2/1972 Elston
4,701,432 A 10/1987 Welborn, Jr.
(Continued)

FOREIGN PATENT DOCUMENTS

CN 102234389 A * 11/2011 ............... C08K 3/22
EP 3 406 666 A1 11/2018
(Continued)

OTHER PUBLICATIONS

CN102234389A English (Year: 2011).*
(Continued)

*Primary Examiner* — Catherine S Branch
*Assistant Examiner* — Huihong Qiao
(74) *Attorney, Agent, or Firm* — Thomas J. Styslinger

(57) ABSTRACT

Polyethylene blends made from recycled polyethylene and a bimodal polyethylene composition are disclosed. The polyethylene blends are suitable for compression molding or injection molding applications and are particularly useful in the manufacture of caps and closures for bottles.

24 Claims, 2 Drawing Sheets

(52) U.S. Cl.
CPC ..... *C08L 2205/24* (2013.01); *C08L 2207/062* (2013.01); *C08L 2207/20* (2013.01)

(56) References Cited

U.S. PATENT DOCUMENTS

| | | | |
|---|---|---|---|
| 4,798,081 | A | 1/1989 | Hazlitt et al. |
| 4,808,561 | A | 2/1989 | Welborn, Jr. |
| 4,935,397 | A | 6/1990 | Chang |
| 4,937,301 | A | 6/1990 | Chang |
| 5,055,438 | A | 10/1991 | Canich |
| 5,057,475 | A | 10/1991 | Canich et al. |
| 5,064,802 | A | 11/1991 | Stevens et al. |
| 5,096,867 | A | 3/1992 | Canich |
| 5,132,380 | A | 7/1992 | Stevens et al. |
| 5,206,075 | A | 4/1993 | Hodgson, Jr. |
| 5,292,845 | A | 3/1994 | Kawasaki et al. |
| 5,324,800 | A | 6/1994 | Welborn et al. |
| 5,376,439 | A | 12/1994 | Hodgson et al. |
| 5,633,394 | A | 5/1997 | Welborn et al. |
| 5,703,187 | A | 12/1997 | Timmers |
| 6,002,033 | A | 12/1999 | Razavi et al. |
| 6,034,021 | A | 3/2000 | Wilson et al. |
| 6,063,879 | A | 5/2000 | Stephan et al. |
| 6,114,481 | A | 9/2000 | McMeeking et al. |
| 6,235,672 | B1 | 5/2001 | McKay et al. |
| 6,277,931 | B1 | 8/2001 | Jaber et al. |
| 6,342,463 | B1 | 1/2002 | Stephan et al. |
| 6,372,864 | B1 | 4/2002 | Brown |
| 6,489,413 | B1 | 12/2002 | Floyd et al. |
| 6,689,847 | B2 | 2/2004 | Mawson et al. |
| 6,777,509 | B2 | 8/2004 | Brown et al. |
| 6,984,695 | B2 | 1/2006 | Brown et al. |
| 2006/0247373 | A1 | 11/2006 | Goyal et al. |
| 2019/0168936 | A1 | 6/2019 | Wang et al. |
| 2023/0174755 | A1* | 6/2023 | Ribour ................ C08L 23/08 |

FOREIGN PATENT DOCUMENTS

| | | |
|---|---|---|
| WO | WO-93/03093 A1 | 2/1993 |
| WO | WO-2005/121239 A2 | 12/2005 |
| WO | WO-2006/048253 A1 | 5/2006 |
| WO | WO-2006/048254 A1 | 5/2006 |
| WO | WO-2012/139967 A1 | 10/2012 |
| WO | WO-2016/005265 A1 | 1/2016 |

OTHER PUBLICATIONS

EP appl 19203305.4 document (Year: 2019).*
ASTM Designation: D1238-13; "Standard Test Method for Melt Flow Rates of Thermoplastics by Extrusion Plastometer", dated May 24, 2019, 16 pages.
ASTM Designation: D1525-07; "Standard Test Method for Vicat Softening Temperature of Plastics", dated Oct. 16, 2019, 9 pages.
ASTM Designation: D1693-15; "Standard Test Method for Environmental Stress-Cracking of Ethylene Plastics", dated Apr. 26, 2017, 11 pages.
ASTM Designation: D256-10; "Standard Test Methods for determining the Izod Pendulum Impact Resistance of Plastics", dated Apr. 26, 2017, 20 pages.
ASTM Designation: D5227-13; "Standard Test Method for Measurement of Hexane Extractable Content of Polyolefins", dated Jun. 1, 2013, 4 pages.
ASTM Designation: D638-14; "Standard Test Method for Tensile Properties of Plastics", dated Apr. 26, 2017, 17 pages.
ASTM Designation: D6474-99 (Reapproved 2006); "Standard Test Method for Determining Molecular Weight Distribution and Molecular Weight Averages of Polyolefins by High Temperature Gel Permeation Chromatography", dated May 24, 2019, 6 pages.
ASTM Designation: D648-16; "Standard Test Method for Deflection Temperature of Plastics Under Flexural Load in the Edgewise Position", dated Apr. 26, 2017, 14 pages.
ASTM Designation: D6645-01 (Reapproved 2010); "Standard Test Method for Methyl (Comonomer) Content in Polyethylene by Infrared Spectrophotometry", dated Jan. 1, 2020, 4 pages.
ASTM Designation: D790-10; "Standard Test Methods for Flexural Properties of Unreinforced and Reinforced Plastics and Electrical Insulating Materials", dated Oct. 16, 2019, 11 pages.
ASTM Designation: D792-13; "Standard Test Methods for Density and Specific Gravity (Relative Density) of Plastics by Displacement", dated Feb. 24, 2014, 6 pages.
International Search Report and Written Opinion corresponding to PCT/IB/2020/059603, dated Feb. 12, 2021 , 23 pages.
L. Wild, et al., Research Division, U.S. Industrial Chemicals Co.,; "Determination of Branching Distributions in Polyethylene and Ethylene Copolymers", vol. 20, 441-455 (1982), 16 pages.
Randall, James C., Baytown Polymers Center, Exxon Chemical Company; "A Review of High Resolution Liquid Carbon Nuclear Magnetic Resonance Characterizations of Ethylene-Based Polymers", JSM-REV. Macromol. Chem Phys., C29 (2&3), 201-317 (1989), 4 pages.

* cited by examiner

USE OF RECYCLED POLYETHYLENE IN CLOSURES FOR BOTTLES

CROSS REFERENCE TO RELATED APPLICATIONS

This application is a U.S. National Phase Application under 35 U.S.C. § 371 of International Application No. PCT/IB2020/059603, filed Oct. 13, 2020, which claims the benefit of priority to U.S. Provisional Application No. 62/915,730, filed Oct. 16, 2019, both of which are incorporated herein by reference in their entirety.

TECHNICAL FIELD

This present disclosure relates to caps and closures made from a blend of recycled polyethylene and a virgin polyethylene composition.

BACKGROUND ART

The use of recycled plastic to produce new parts is desirable because it diverts plastic waste from landfills and because it reduces the demand for new (or "virgin") plastic. Accordingly, there have been attempts to recycle many different types of plastics including polypropylene (PP); polyvinyl chloride (PVC); polyethylene terephthalate (PET); polycarbonate (PC); polystyrene (PS); linear low density polyethylene (LLDPE); low density polyethylene (LD PE) and high density polyethylene (HDPE).

One problem that is found when using recycled plastic is that undesired odors can occur. These odors may result from excessive processing of the plastics, contamination in the recycle stream or a combination of both.

There are also reports that it can be difficult to achieve desired physical properties (such as environmental stress crack resistance (ESCR); and impact resistance) when using recycled HDPE and that these difficulties may be addressed through the use of LLDPE; or an impact modifier.

SUMMARY OF INVENTION

Provided in this disclosure is a polyethylene blend that includes from 1 weight % (wt. %) to 50 wt. % recycled polyethylene and from 50 wt. % to 99 wt. % of a bimodal polyethylene composition. The recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load from 0.3 to 30 g/10 minutes. The bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load, from 0.1 to 12 g/10 minutes, and a B10 ESCR, as determined by ASTM D1693, from 10 to 2000.

In some embodiments, the recycled polyethylene has a density from 0.930 g/cm$^3$ to 0.970 g/cm$^3$, as measured by ASTM D792.

In some embodiments, the recycled polyethylene has a density from 0.952 g/cm$^3$ to 0.970 g/cm$^3$ as measured by ASTM D792.

In some embodiments, the recycled polyethylene has a melt index, $I_2$, as determined by ASTM D1238 at 190° C. using a 2.16 kg load, from 0.5 g/10 minutes to 10 g/10 minutes.

In some embodiments, the recycled polyethylene has a melt index, $I_2$, as determined by ASTM D1238 at 190° C. using a 2.16 kg load, from 0.5 g/10 minutes to 4 g/10 minutes.

In some embodiments, the bimodal polyethylene composition has a density from 0.945 g/cm$^3$ to 0.966 g/cm$^3$ as measured by ASTM D792.

In some embodiments, the bimodal polyethylene composition has a density from 0.949 g/cm$^3$ to 0.962 g/cm$^3$ as measured by ASTM D792.

In some embodiments, the bimodal polyethylene composition has a melt index, $I_2$, from between 0.2 g/10 min to 7 g/10 min according to ASTM D1238, when conducted at 190° C., using a 2.16 kg weight.

In some embodiments, the bimodal polyethylene composition has a melt index, $I_2$, from between 0.3 g/10 min to 4 g/10 min according to ASTM D1238, when conducted at 190° C., using a 2.16 kg weight.

In some embodiments, the bimodal polyethylene composition has a melt index, $I_2$, from between 0.3 g/10 min to 4 g/10 min according to ASTM D1238, when conducted at 190° C., using a 2.16 kg weight.

In some embodiments, the bimodal polyethylene composition has a B10 ESCR, as determined by ASTM D1693, from 50 to 1000.

In some embodiments, the bimodal polyethylene composition has a B10 ESCR, as determined by ASTM D1693, from 100 to 600.

In some embodiments, the polyethylene blend composition further includes a hindered phenolic primary antioxidant additive.

In some embodiments, the polyethylene blend composition further includes, tris(2-4-di-tert-butylphenyl)phosphite, 6-[3-(3-tert-butyl-4-hydroxy-5-methylphenyl)propoxy]-2,4, 8,10-tetra-tert-butyldibenzo[d,f][1,3,2] dioxaphospepin, bis (2,4,6-tri-tert-butylphenyl) pentaerythritol diphosphite, bis (2,4-dicumylphenyl)pentaerythritol diphosphate, or a mixture thereof.

In some embodiments, the first ethylene copolymer and the second ethylene copolymer are made using a single site catalyst.

In some embodiments, the bimodal polyethylene composition includes 10 to 70 wt. % of a first ethylene copolymer having a melt index $I_2$, of less than 0.4 g/10 min; a molecular weight distribution, $M_w/M_n$, of less than 2.7; and a density from 0.920 g/cm$^3$ to 0.955 g/cm$^3$; and 30 to 90 wt. % of a second ethylene copolymer having a melt index $I_2$, from 100 to 20,000 g/10 min; a molecular weight distribution $M_w/M_n$, of less than 2.7; and a density higher than the density of the first ethylene copolymer, but less than 0.967 g/cm$^3$.

In some embodiments, the first ethylene copolymer of the bimodal polyethylene composition has a density from 0.925 g/cm$^3$ to 0.950 g/cm$^3$.

In some embodiments, the second ethylene copolymer of the bimodal polyethylene composition has a density less than 0.965 g/cm$^3$.

In some embodiments, the bimodal polyethylene composition has a density from 0.951 g/cm$^3$ to 0.960 g/cm$^3$.

In some embodiments, the density of the second ethylene copolymer of the bimodal polyethylene composition is less than 0.035 g/cm$^3$ higher than the density of the first ethylene copolymer.

In some embodiments, the bimodal polyethylene composition includes from 30 wt. % to 60 wt. % of the first ethylene copolymer; and from 70 wt. % to 40 wt. % of the second ethylene copolymer.

In some embodiments, the bimodal polyethylene composition further includes a nucleating agent or a mixture of nucleating agents.

In some embodiments, the first and second ethylene copolymers of the bimodal polyethylene composition are copolymers of ethylene and 1-octene.

In some embodiments, the bimodal polyethylene composition is SURPASS® CCs 154.

Also provided herein is a molded article prepared from a polyethylene blend that includes from 1 wt. % to 50 wt. % recycled polyethylene; and from 50 wt. % to 99 wt. % of a bimodal polyethylene composition. The recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load, from 0.3 to 30 g/10 minutes. The bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load from 0.1 to 12 g/10 minutes, and a B10 ESCR as determined by ASTM D1693 from 10 to 2000.

In some embodiments, the recycled polyethylene has a density from 0.930 g/cm$^3$ to 0.970 g/cm$^3$, as measured by ASTM D792.

In some embodiments, the recycled polyethylene has a density from 0.952 g/cm$^3$ to 0.970 g/cm$^3$ as measured by ASTM D792.

In some embodiments, the recycled polyethylene has a melt index, $I_2$, as determined by ASTM D1238 at 190° C. using a 2.16 kg load, from 0.5 g/10 minutes to 10 g/10 minutes.

In some embodiments, the recycled polyethylene has a melt index, $I_2$, as determined by ASTM D1238 at 190° C. using a 2.16 kg load, from 0.5 g/10 minutes to 4 g/10 minutes.

In some embodiments, the bimodal polyethylene composition has a density from 0.945 g/cm$^3$ to 0.966 g/cm$^3$ as measured by ASTM D792.

In some embodiments, the bimodal polyethylene composition has a density from 0.949 g/cm$^3$ to 0.962 g/cm$^3$ as measured by ASTM D792.

In some embodiments, the bimodal polyethylene composition has a melt index, $I_2$, from between 0.2 g/10 min to 7 g/10 min according to ASTM D1238, when conducted at 190° C., using a 2.16 kg weight.

In some embodiments, the bimodal polyethylene composition has a melt index, $I_2$, from between 0.3 g/10 min to 4 g/10 min according to ASTM D1238, when conducted at 190° C., using a 2.16 kg weight.

In some embodiments, the bimodal polyethylene composition has a melt index, $I_2$, from between 0.3 g/10 min to 4 g/10 min according to ASTM D1238, when conducted at 190° C., using a 2.16 kg weight.

In some embodiments, the bimodal polyethylene composition has a B10 ESCR, as determined by ASTM D1693, from 50 to 1000.

In some embodiments, the bimodal polyethylene composition has a B10 ESCR, as determined by ASTM D1693, from 100 to 600.

In some embodiments, the polyethylene blend composition further includes a hindered phenolic primary antioxidant additive.

In some embodiments, the polyethylene blend composition further includes, tris(2-4-di-tert-butylphenyl)phosphite, 6-[3-(3-tert-butyl-4-hydroxy-5-methylphenyl)propoxy]-2,4,8,10-tetra-tert-butyldibenzo[d,f][1,3,2] dioxaphospepin, bis (2,4,6-tri-tert-butylphenyl) pentaerythritol diphosphite, bis (2,4-dicumylphenyl)pentaerythritol diphosphate, or a mixture thereof.

In some embodiments, the first ethylene copolymer and the second ethylene copolymer are made using a single site catalyst.

In some embodiments, the bimodal polyethylene composition includes 10 to 70 wt. % of a first ethylene copolymer having a melt index $I_2$, of less than 0.4 g/10 min; a molecular weight distribution, $M_w/M_n$, of less than 2.7; and a density from 0.920 g/cm$^3$ to 0.955 g/cm$^3$; and 30 to 90 wt. % of a second ethylene copolymer having a melt index $I_2$, from 100 to 20,000 g/10 min; a molecular weight distribution $M_w/M_n$, of less than 2.7; and a density higher than the density of the first ethylene copolymer, but less than 0.967 g/cm$^3$.

In some embodiments, the first ethylene copolymer of the bimodal polyethylene composition has a density from 0.925 g/cm$^3$ to 0.950 g/cm$^3$.

In some embodiments, the second ethylene copolymer of the bimodal polyethylene composition has a density less than 0.965 g/cm$^3$.

In some embodiments, the bimodal polyethylene composition has a density from 0.951 g/cm$^3$ to 0.960 g/cm$^3$.

In some embodiments, the density of the second ethylene copolymer of the bimodal polyethylene composition is less than 0.035 g/cm$^3$ higher than the density of the first ethylene copolymer.

In some embodiments, the bimodal polyethylene composition includes from 30 wt. % to 60 wt. % of the first ethylene copolymer; and from 70 wt. % to 40 wt. % of the second ethylene copolymer.

In some embodiments, the bimodal polyethylene composition further includes a nucleating agent or a mixture of nucleating agents.

In some embodiments, the first and second ethylene copolymers of the bimodal polyethylene composition are copolymers of ethylene and 1-octene.

In some embodiments, the bimodal polyethylene composition is SURPASS CCs 154.

Also provided herein is a cap prepared from a polyethylene blend that includes from 1 wt. % to 50 wt. % recycled polyethylene; and from 50 wt. % to 99 wt. % of a bimodal polyethylene composition. The recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load from 0.3 to 30 g/10 minutes. The bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load from 0.1 to 12 g/10 minutes, and a B10 ESCR as determined by ASTM D1693 from 10 to 2000. In some embodiments, the recycled polyethylene has a density from 0.930 g/cm$^3$ to 0.970 g/cm$^3$, as measured by ASTM D792.

In some embodiments, the recycled polyethylene has a density from 0.952 g/cm$^3$ to 0.970 g/cm$^3$ as measured by ASTM D792.

In some embodiments, the recycled polyethylene has a melt index, $I_2$, as determined by ASTM D1238 at 190° C. using a 2.16 kg load, from 0.5 g/10 minutes to 10 g/10 minutes.

In some embodiments, the recycled polyethylene has a melt index, $I_2$, as determined by ASTM D1238 at 190° C. using a 2.16 kg load, from 0.5 g/10 minutes to 4 g/10 minutes.

In some embodiments, the bimodal polyethylene composition has a density from 0.945 g/cm$^3$ to 0.966 g/cm$^3$ as measured by ASTM D792.

In some embodiments, the bimodal polyethylene composition has a density from 0.949 g/cm$^3$ to 0.962 g/cm$^3$ as measured by ASTM D792.

In some embodiments, the bimodal polyethylene composition has a melt index, $I_2$, from between 0.2 g/10 min to 7 g/10 min according to ASTM D1238, when conducted at 190° C., using a 2.16 kg weight.

In some embodiments, the bimodal polyethylene composition has a melt index, $I_2$, from between 0.3 g/10 min to 4 g/10 min according to ASTM D1238, when conducted at 190° C., using a 2.16 kg weight.

In some embodiments, the bimodal polyethylene composition has a melt index, $I_2$, from between 0.3 g/10 min to 4 g/10 min according to ASTM D1238, when conducted at 190° C., using a 2.16 kg weight.

In some embodiments, the bimodal polyethylene composition has a B10 ESCR, as determined by ASTM D1693, from 50 to 1000.

In some embodiments, the bimodal polyethylene composition has a B10 ESCR, as determined by ASTM D1693, from 100 to 600.

In some embodiments, the polyethylene blend composition further includes a hindered phenolic primary antioxidant additive.

In some embodiments, the polyethylene blend composition further includes, tris(2-4-di-tert-butylphenyl)phosphite, 6-[3-(3-tert-butyl-4-hydroxy-5-methylphenyl)propoxy]-2,4,8,10-tetra-tert-butyldibenzo[d,f][1,3,2] dioxaphospepin, bis (2,4,6-tri-tert-butylphenyl) pentaerythritol diphosphite, bis (2,4-dicumylphenyl)pentaerythritol diphosphate, or a mixture thereof.

In some embodiments, the first ethylene copolymer and the second ethylene copolymer are made using a single site catalyst.

In some embodiments, the bimodal polyethylene composition includes 10 to 70 wt. % of a first ethylene copolymer having a melt index $I_2$, of less than 0.4 g/10 min; a molecular weight distribution, $M_w/M_n$, of less than 2.7; and a density from 0.920 g/cm$^3$ to 0.955 g/cm$^3$; and 30 to 90 wt. % of a second ethylene copolymer having a melt index $I_2$, from 100 to 20,000 g/10 min; a molecular weight distribution $M_w/M_n$, of less than 2.7; and a density higher than the density of the first ethylene copolymer, but less than 0.967 g/cm$^3$.

In some embodiments, the first ethylene copolymer of the bimodal polyethylene composition has a density from 0.925 g/cm$^3$ to 0.950 g/cm$^3$.

In some embodiments, the second ethylene copolymer of the bimodal polyethylene composition has a density less than 0.965 g/cm$^3$.

In some embodiments, the bimodal polyethylene composition has a density from 0.951 g/cm$^3$ to 0.960 g/cm$^3$.

In some embodiments, the density of the second ethylene copolymer of the bimodal polyethylene composition is less than 0.035 g/cm$^3$ higher than the density of the first ethylene copolymer.

In some embodiments, the bimodal polyethylene composition includes from 30 wt. % to 60 wt. % of the first ethylene copolymer; and from 70 wt. % to 40 wt. % of the second ethylene copolymer.

In some embodiments, the bimodal polyethylene composition further includes a nucleating agent or a mixture of nucleating agents.

In some embodiments, the first and second ethylene copolymers of the bimodal polyethylene composition are copolymers of ethylene and 1-octene.

In some embodiments, the bimodal polyethylene composition is SURPASS CCs 154.

DESCRIPTION OF EMBODIMENTS

Figure 1:
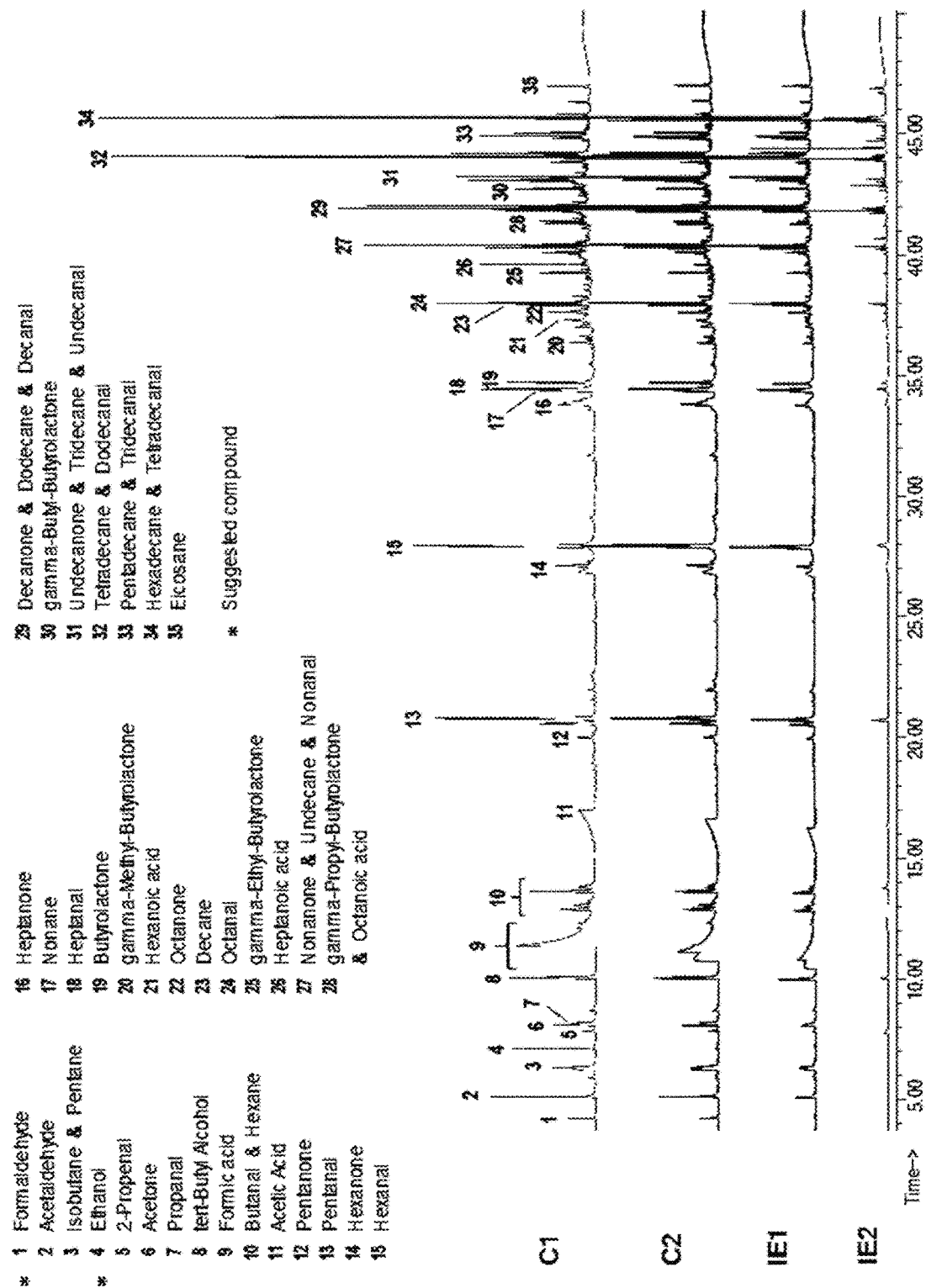
FIG. 1 is a GC-MS total ion chromatogram for samples heated to 220° C. for 10 minutes in a sealed vial.

The present disclosure is related to caps and closures for bottles and to the polyethylene blends used to manufacture them.

The terms "cap" and "closure" are used interchangeably in the current disclosure, and both connote any suitably shaped molded article for enclosing, sealing, closing or covering etc., a suitably shaped opening, a suitably molded aperture, an open necked structure or the like used in combination with a container, a bottle, a jar, and the like.

The polyethylene blends disclosed herein are prepared from recycled polyethylene (discussed in Part A) and a "virgin", bimodal, high density polyethylene composition (referred to hereinafter as "bimodal high density polyethylene composition" and/or "polyethylene composition"—discussed in Part B).

Provided in this disclosure is a polyethylene blend that includes from 1 weight % (wt. %) to 50 wt. % recycled polyethylene and from 50 wt. % to 99 wt. % of a bimodal polyethylene composition. The recycled polyethylene has a density from 0.916 to 0.970 g/cc as measured by ASTM D792, and a melt index, $I_2$, as determined by ASTM D1238 at 190° C. using a 2.16 kg load from 0.3 to 30 g/10 minutes. The bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load, from 0.1 to 12 g/10 minutes, and a B10 ESCR, as determined by ASTM D1693, from 10 to 2000.

Also provided in this disclosure is a cap prepared from a polyethylene blend that includes from 1 wt. % to 50 wt. % recycled polyethylene and from 50 wt. % to 99 wt. % of a bimodal polyethylene composition. The recycled polyethylene has a density from 0.916 g/cm$^3$ to 0.970 g/cm$^3$ and a melt index, $I_2$, as determined by ASTM D1238 at 190° C. using a 2.16 kg load from 0.3 to 30 g/10 minutes. The bimodal polyethylene composition has a density from 0.930 g/cm$^3$ to 0.970 g/cm$^3$ and a melt index, $I_2$, as determined by ASTM D1238 at 190° C. using a 2.16 kg load from 0.1 to 12 g/10 minutes, and a B10 ESCR as determined by ASTM D1693 from 10 to 2000.

Also provided herein is a molded article prepared from a polyethylene blend that includes from 1 wt. % to 50 wt. % recycled polyethylene; and from 50 wt. % to 99 wt. % of a bimodal polyethylene composition. The recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load, from 0.3 to 30 g/10 minutes. The bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load from 0.1 to 12 g/10 minutes, and a B10 ESCR as determined by ASTM D1693 from 10 to 2000.

Part A: Recycled High Density Polyethylene

Recycled Polyethylene

The term "recycled polyethylene" as used herein refers to polyethylene that has been exposed to at least one heat history. It will be appreciated by those skilled in the art that polyethylene is typically converted into finished goods in processes that involve melting the polyethylene and then forming it into the finished good. The melting process is referred to as a "heat history."

Recycled plastic may have been recovered or otherwise diverted from the solid waste stream. Recycled materials diverted either during the manufacturing process or after the manufacturing process but before consumer use is sometimes referred to as postindustrial resin, postindustrial recycle, or PIR. Recycled materials recovered after consumer use is sometimes referred to as post-consumer recycled resins, or PCR). The term "recycled" refers to both PIR and PCR. Either material, or blends of both, are suitable for use as disclosed herein.

Both PCR and PIR materials can be purchased commercially.

Another source of recycled polyethylene is from used polyethylene parts that are first cleaned, next melted in an extruder and then converted into pellets for sale. This source of recycled polyethylene may be exposed to at least two heat histories—one in the original conversion process and another in the process to prepare recycled polyethylene pellets.

Processes where materials experience heat histories will generally cause the formation of free radicals and hydroperoxides in the polyethylene. Most polyethylene is sold with an antioxidant system that contains a primary antioxidant (designed to trap free radicals) and a secondary antioxidant (designed to quench hydroperoxides). Hindered phenols are commonly used as the primary antioxidant (e.g. IRGANOX® 1010 and IRGANOX 1076, sold by BASF) and hindered phosphites are commonly used as the secondary antioxidant (e.g. IRGAPHOS® 168).

These antioxidants may be oxidized during a heat history. It is known to use HPLC methods to measure the level of consumed antioxidants (oxidized antioxidants) in a polyethylene and to use this value of an indication of the "heat history" that the polyethylene has been exposed to.

The recycled polyethylene used in this disclosure has a density, for example the density may range from 0.916 g/cm$^3$ to 0.970 g/cm$^3$, or for example, from 0.930 g/cm$^3$ to 0.970 g/cm$^3$, or for example, from 0.935 g/cm$^3$ to 0.967 g/cm$^3$, or for example from 0.952 g/cm$^3$ to 0.970 g/cm$^3$, or for example from 0.952 g/cm$^3$ to 0.967 g/cm$^3$ as measured by ASTM D792.

In some embodiments the recycled polyethylene has a melt index, $I_2$, as determined by ASTM D1238 at 190° C. using a 2.16 kg load from 0.3 to 30 g/10 minutes, or for example from 0.5 to 10 g/10 minutes, or for example 0.5 to 4 g/10 minutes.

In some embodiments, the recycled polyethylene includes recycled material from recycled beverage containers (for example milk jugs). An example of this is a PCR sold by Envision under the trademark ECOPRIME®.

Part B: Bimodal High Density Polyethylene Composition

The bimodal polyethylene compositions are composed of at least two ethylene copolymer components: a first ethylene copolymer and a second ethylene copolymer.

The terms "homogeneous" or "homogeneously branched polymer" as used herein define homogeneously branched polyethylene which has a relatively narrow composition distribution, as indicated by a relatively high composition distribution breadth index (CDBI). That is, the comonomer is randomly distributed within a given polymer chain and substantially all of the polymer chains have same ethylene/comonomer ratio.

It is well known that metallocene catalysts and other so called "single site catalysts" incorporate comonomer more evenly than traditional Ziegler-Natta catalysts when used for catalytic ethylene copolymerization with alpha olefins. This fact is often demonstrated by measuring the composition distribution breadth index (CDBI) for corresponding ethylene copolymers. The composition distribution of a polymer can be characterized by the short chain distribution index (SCDI) or composition distribution breadth index (CDBI). The definition of composition distribution breadth index (CDBI) can be found in PCT publication WO 93/03093 and U.S. Pat. No. 5,206,075. The CDBI is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p. 441, 1982 or in U.S. Pat. No. 4,798,081 can be employed. From the weight fraction versus composition distribution curve, the CDBI is determined by establishing the weight percentage of a copolymer sample that has a comonomer content within 50% of the median comonomer content on each side of the median. Generally, Ziegler-Natta catalysts produce ethylene copolymers with a CDBI of less than about 50%, consistent with a heterogeneously branched copolymer. In contrast, metallocenes and other single site catalysts will most often produce ethylene copolymers having a CDBI of greater than about 55%, consistent with a homogeneously branched copolymer.

The First Ethylene Copolymer

In an embodiment, the first ethylene copolymer of the polyethylene composition has a density from about 0.920 g/cm$^3$ to about 0.955 g/cm$^3$; a melt index, $I_2$, of less than about 0.4 g/10 min; a molecular weight distribution, $M_w/M_n$, of below about 3.0 and a weight average molecular weight, $M_w$, that is greater than the $M_w$ of the second ethylene copolymer. Preferably, the weight average molecular weight, $M_w$, of the first ethylene copolymer is at least 110,000. Preferably, the first ethylene copolymer is a homogeneously branched copolymer.

By the term "ethylene copolymer" it is meant that the copolymer comprises both ethylene and at least one alpha-olefin comonomer.

In an embodiment, the first ethylene copolymer is made with a single site catalyst, such as for example a phosphinimine catalyst.

In an embodiment, the comonomer (i.e. alpha-olefin) content in the first ethylene copolymer can be from about 0.05 mol % to about 3.0 mol %. The comonomer content of the first ethylene polymer is determined by mathematical deconvolution methods applied to a bimodal polyethylene composition (see the Examples section). The comonomer is one or more suitable alpha olefin such as but not limited to 1-butene, 1-hexene, 1-octene and the like, with 1-octene being preferred.

The short chain branching in the first ethylene copolymer can be from about 0.25 to about 15 short chain branches per thousand carbon atoms (SCB1/1000Cs). In further embodiments, the short chain branching in the first ethylene copolymer can be from 0.5 to 15, or from 0.5 to 12, or from 0.5 to 10, or from 0.75 to 15, or from 0.75 to 12, or from 0.75 to 10, or from 1.0 to 10, or from 1.0 to 8.0, or from 1.0 to 5, or from 1.0 to 3 branches per thousand carbon atoms (SCB1/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the first ethylene copolymer is determined by mathematical deconvolution methods applied to a bimodal polyethylene composition (see the Examples section). The comonomer is one or more suitable alpha olefin such as but not limited to 1-butene, 1-hexene, 1-octene and the like, with 1-octene being preferred.

In an embodiment, the comonomer content in the first ethylene copolymer is substantially similar or approximately equal (e.g. within about ±0.05 mol %) to the comonomer content of the second ethylene copolymer (as reported for example in mol %).

In an embodiment, the comonomer content in the first ethylene copolymer is greater than comonomer content of the second ethylene copolymer (as reported for example in mol %).

In an embodiment, the amount of short chain branching in the first ethylene copolymer is substantially similar or approximately equal (e.g. within about ±0.25 SCB/1000Cs) to the amount of short chain branching in the second ethylene copolymer (as reported in short chain branches, SCB per thousand carbons in the polymer backbone, 1000Cs).

In an embodiment, the amount of short chain branching in the first ethylene copolymer is greater than the amount of short chain branching in the second ethylene copolymer (as reported in short chain branches, SCB per thousand carbons in the polymer backbone, 1000Cs).

The melt index of the first ethylene copolymer can in an embodiment be above 0.01, but below 0.4 g/10 min.

In an embodiment, the first ethylene copolymer has a weight average molecular weight $M_w$ from about 110,000 to about 250,000. In another embodiment, the first ethylene copolymer has a weight average molecular weight $M_w$ of greater than about 110,000 to less than about 250,000. In further embodiments, the first ethylene copolymer has a weight average molecular weight $M_w$ from about 125,000 to about 225,000, or from about 135,000 to 200,000.

In an embodiment, the density of the first ethylene copolymer is from 0.920 g/cm³ to 0.955 g/cm³ or can be a narrower range within this range. For example, in further embodiments, the density of the first ethylene copolymer can be from 0.925 g/cm³ to 0.955 g/cm³, or from 0.925 g/cm³ to 0.950 g/cm³, or from 0.925 g/cm³ to 0.945 g/cm³, or from 0.925 g/cm³ to 0.940 g/cm³, or from 0.925 g/cm³ to 0.935 g/cm³, or from 0.927 g/cm³ to 0.945 g/cm³, or from 0.927 g/cm³ to 0.940 g/cm³, or from 0.927 g/cm³ to 0.935 g/cm³.

In an embodiment, the first ethylene copolymer has a molecular weight distribution $M_w/M_n$ of <3.0, or ≤2.7, or <2.7, or ≤2.5, or <2.5, or ≤2.3, or from 1.8 to 2.3.

The density and the melt index, $I_2$, of the first ethylene copolymer can be estimated from GPC (gel permeation chromatography) and GPC-FTIR (gel permeation chromatography with Fourier transform infra-red detection) experiments and deconvolutions carried out on the bimodal polyethylene composition (see the Examples section).

In an embodiment, the first ethylene copolymer of the polyethylene composition is a homogeneously branched ethylene copolymer having a weight average molecular weight, $M_w$, of at least 110000; a molecular weight distribution, $M_w/M_n$, of less than 2.7 and a density from 0.925 g/cm³ to 0.948 g/cm³.

In an embodiment, the first ethylene copolymer is homogeneously branched ethylene copolymer and has a CDBI of greater than about 50%, preferably of greater than about 55%. In further embodiments, the first ethylene copolymer has a CDBI of greater than about 60%, or greater than about 65%, or greater than about 70%.

The first ethylene copolymer can comprise from 10 wt. % to 70 wt. % of the total weight of the first and second ethylene copolymers. In an embodiment, the first ethylene copolymer comprises from 20 wt. % to 60 wt. % of the total weight of the first and second ethylene copolymers. In an embodiment, the first ethylene copolymer comprises from 30 wt. % to 60 wt. % of the total weight of the first and second ethylene copolymers. In an embodiment, the first ethylene copolymer comprises from 40 wt. % to 50 wt. % of the total weight of the first and second ethylene copolymers.

The Second Ethylene Copolymer

In an embodiment, the second ethylene copolymer of the polyethylene composition has a density below 0.967 g/cm³ but which is higher than the density of the first ethylene copolymer; a melt index, $I_2$, from about 100 to 10,000 g/10 min; a molecular weight distribution, $M_w/M_n$, of below about 3.0 and a weight average molecular weight $M_w$ that is less than the $M_w$ of the first ethylene copolymer. Preferably, the weight average molecular weight, $M_w$ of the second ethylene copolymer will be below 45,000. Preferably the second ethylene copolymer is homogeneously branched copolymer.

By the term "ethylene copolymer" it is meant that the copolymer comprises both ethylene and at least one alpha-olefin comonomer.

In an embodiment, the second ethylene copolymer is made with a single site catalyst, such as for example a phosphinimine catalyst.

The comonomer content in the second ethylene copolymer can be from about 0.05 mol % to about 3 mol % as measured by $^{13}$C NMR, or FTIR or GPC-FTIR methods. The comonomer content of the second ethylene polymer can also be determined by mathematical deconvolution methods applied to a bimodal polyethylene composition (see the Examples section). The comonomer is one or more suitable alpha olefin such as but not limited to 1-butene, 1-hexene, 1-octene and the like, with the use of 1-octene being preferred.

The short chain branching in the second ethylene copolymer can be from about 0.25 to about 15 short chain branches per thousand carbon atoms (SCB2/1000Cs). In further embodiments, the short chain branching in the first ethylene copolymer can be from 0.25 to 12, or from 0.25 to 8, or from 0.25 to 5, or from 0.25 to 3, or from 0.25 to 2 branches per thousand carbon atoms (SCB2/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the second ethylene copolymer can be measured by $^{13}$C NMR, or FTIR or GPC-FTIR methods. Alternatively, the number of short chain branches in the second ethylene copolymer can be determined by mathematical deconvolution methods applied to a bimodal polyethylene composition (see the Examples section). The comonomer is one or more suitable alpha olefin such as but not limited to 1-butene, 1-hexene, 1-octene and the like, with 1-octene being preferred.

In an embodiment, the comonomer content in the second ethylene copolymer is substantially similar or approximately equal (e.g. within about ±0.05 mol %) to the comonomer content of the first ethylene copolymer (as reported for example in mol %).

In an embodiment, the comonomer content in the second ethylene copolymer is less than the comonomer content of the first ethylene copolymer (as reported for example in mol %).

In an embodiment, the amount of short chain branching in the second ethylene copolymer is substantially similar or approximately equal (e.g. within about ±0.25 SCB/1000C) to the amount of short chain branching in the first ethylene copolymer (as reported in short chain branches, SCB per thousand carbons in the polymer backbone, 1000Cs).

In an embodiment, the amount of short chain branching in the second ethylene copolymer is less than the amount of short chain branching in the first ethylene copolymer (as reported in short chain branches, SCB per thousand carbons in the polymer backbone, 1000Cs).

In an embodiment, the density of the second ethylene copolymer is less than 0.967 g/cm$^3$. The density of the second ethylene copolymer, in another embodiment, is less than 0.966 g/cm$^3$. In another embodiment, the density of the second ethylene copolymer is less than 0.965 g/cm$^3$. In another embodiment, the density of the second ethylene copolymer is less than 0.964 g/cm$^3$. In another embodiment, the density of the second ethylene copolymer is less than 0.963 g/cm$^3$. In another embodiment, the density of the second ethylene copolymer is less than 0.962 g/cm$^3$.

In an embodiment, the density of the second ethylene copolymer is from 0.952 g/cm$^3$ to 0.966 g/cm$^3$ or can be a narrower range within this range.

In an embodiment, the second ethylene copolymer has a weight average molecular weight $M_w$ of less than 25,000. In another embodiment, the second ethylene copolymer has a weight average molecular weight $M_w$ from about 7,500 to about 23,000. In further embodiments, the second ethylene copolymer has a weight average molecular weight $M_w$ from about 9,000 to about 22,000, or from about 10,000 to about 17,500, or from about 7,500 to 17,500.

In an embodiment, the second ethylene copolymer has a molecular weight distribution of <3.0, or ≤2.7, or <2.7, or ≤2.5, or <2.5, or ≤2.3, or from 1.8 to 2.3.

In an embodiment, the melt index $I_2$ of the second ethylene copolymer can be from 20 to 10,000 g/10 min. In another embodiment, the melt index $I_2$ of the second ethylene copolymer can be from 100 to 10,000 g/10 min. In yet another embodiment, the melt index $I_2$ of the second ethylene copolymer can be from 1000 to 7000 g/10 min. In yet another embodiment, the melt index $I_2$ of the second ethylene copolymer can be from 1200 to 10,000 g/10 min. In yet another embodiment, the melt index $I_2$ of the second ethylene copolymer can be from 1500 to 10,000 g/10 min. In yet another embodiment, the melt index $I_2$ of the second ethylene copolymer can be greater than 1500, but less than 7000 g/10 min.

In an embodiment, the melt index $I_2$ of the second ethylene copolymer is greater than 200 g/10 min. In an embodiment, the melt index $I_2$ of the second ethylene copolymer is greater than 500 g/10 min. In an embodiment, the melt index $I_2$ of the second ethylene copolymer is greater than 1000 g/10 min. In an embodiment, the melt index $I_2$ of the second ethylene copolymer is greater than 1200 g/10 min. In an embodiment, the melt index $I_2$ of the second ethylene copolymer is greater than 1500 g/10 min.

The density of the second ethylene copolymer may be measured according to ASTM D792. The melt index, $I_2$, of the second ethylene copolymer may be measured according to ASTM D1238 (when conducted at 190° C., using a 2.16 kg weight).

The density and the melt index, $I_2$, of the second ethylene copolymer can optionally be estimated from GPC and GPC-FTIR experiments and deconvolutions carried out on a bimodal polyethylene composition (see the below Examples section).

In an embodiment, the second ethylene copolymer of the polyethylene composition is a homogeneous ethylene copolymer having a weight average molecular weight, $M_w$, of at most 45000; a molecular weight distribution, $M_w/M_n$, of less than 2.7 and a density higher than the density of said first ethylene copolymer, but less than 0.967 g/cm$^3$.

In an embodiment, the second ethylene copolymer is homogeneously branched ethylene copolymer and has a CDBI of greater than about 50%, preferably of greater than about 55%. In further embodiments, the second ethylene copolymer has a CDBI of greater than about 60%, or greater than about 65%, or greater than about 70%.

The second ethylene copolymer can comprise from 90 wt. % to 30 wt. % of the total weight of the first and second ethylene copolymers. In an embodiment, the second ethylene copolymer comprises from 80 wt. % to 40 wt. % of the total weight of the first and second ethylene copolymers. In an embodiment, the second ethylene copolymer comprises from 70 wt. % to 40 wt. % of the total weight of the first and second ethylene copolymers. In an embodiment, the second ethylene copolymer comprises from 60 wt. % to 50 wt. % of the total weight of the first and second ethylene copolymers.

In an embodiment, the second ethylene copolymer has a density which is higher than the density of the first ethylene copolymer, but less than about 0.037 g/cm$^3$ higher than the density of the first ethylene copolymer. In an embodiment, the second ethylene copolymer has a density which is higher than the density of the first ethylene copolymer, but less than about 0.035 g/cm$^3$ higher than the density of the first ethylene copolymer. In another embodiment, the second ethylene copolymer has a density which is higher than the density of the first ethylene copolymer, but less than about 0.031 g/cm$^3$ higher than the density of the first ethylene copolymer. In still another embodiment, the second ethylene copolymer has a density which is higher than the density of the first ethylene copolymer, but less than about 0.030 g/cm$^3$ higher than the density of the first ethylene copolymer.

In embodiments, the $I_2$ of the second ethylene copolymer is at least 100 times, or at least 1000 times, or at least 10,000 the $I_2$ of the first ethylene copolymer.

The Bimodal Polyethylene Composition

The polyethylene composition has a bimodal or multimodal molecular weight distribution. Minimally, the polyethylene composition will contain a first ethylene copolymer and a second ethylene copolymer (as defined above) which are of different weight average molecular weight ($M_w$).

In an embodiment, the polyethylene composition will minimally comprise a first ethylene copolymer and a second ethylene copolymer (as defined above) and the ratio (SCB1/SCB2) of the number of short chain branches per thousand carbon atoms in the first ethylene copolymer (i.e. SCB1) to the number of short chain branches per thousand carbon atoms in the second ethylene copolymer (i.e. SCB2) will be greater than 0.5 (i.e. SCB1/SCB2>0.5).

In an embodiment, the ratio of the short chain branching in the first ethylene copolymer (SCB1) to the short chain branching in the second ethylene copolymer (SCB2) is at least 0.60. In another embodiment, the ratio of the short chain branching in the first ethylene copolymer (SCB1) to the short chain branching in the second ethylene copolymer (SCB2) is at least 0.75. In another embodiment, the ratio of the short chain branching in the first ethylene copolymer (SCB1) to the short chain branching in the second ethylene copolymer (SCB2) is at least 1.0. In yet another embodiment, the ratio of the short chain branching in the first ethylene copolymer (SCB1) to the short chain branching in the second ethylene copolymer (SCB2) is at least 1.25. In still another embodiment, the ratio of the short chain branching in the first ethylene copolymer (SCB1) to the short chain branching in the second ethylene copolymer (SCB2) is at least 1.5.

In an embodiment, the ratio of the short chain branching in the first ethylene copolymer (SCB1) to the short chain branching in the second ethylene copolymer (SCB2) will be greater than 0.5, but less than 1.0.

In an embodiment, the ratio of the short chain branching in the first ethylene copolymer (SCB1) to the short chain branching in the second ethylene copolymer (SCB2) will be approximately 1.0 (e.g. within ±10%, or from about 0.9 to about 1.1).

In embodiments, the ratio (SCB1/SCB2) of the short chain branching in the first ethylene copolymer (SCB1) to the short chain branching in the second ethylene copolymer (SCB2) will be from 0.75 to 12.0, or from 1.0 to 10, or from 1.0 to 7.0, or from 1.0 to 5.0, or from 1.0 to 3.0.

The polyethylene composition can have a bimodal molecular weight distribution. The term "bimodal" means that the polyethylene composition comprises at least two components, one of which has a lower weight average molecular weight and a higher density and another of which has a higher weight average molecular weight and a lower density. Typically, a bimodal or multimodal polyethylene composition can be identified by using gel permeation chromatography (GPC). Generally, the GPC chromatograph will exhibit two or more component ethylene copolymers, where the number of component ethylene copolymers corresponds to the number of discernible peaks. One or more component ethylene copolymers may also exist as a hump, shoulder or tail relative to the molecular weight distribution of the other ethylene copolymer component.

The bimodal polyethylene composition has a density from to 0.930 g/cm³ to 0.970 g/cm³, as measured according to ASTM D792; a melt index, $I_2$, from about 0.1 to 12 g/10 min, as measured according to ASTM D1238 (when conducted at 190° C., using a 2.16 kg weight); and an ESCR Condition B at 10% of 10 to 2000 hours.

In embodiments, the polyethylene composition has a comonomer content of less than 0.75 mol %, or less than 0.70 mol %, or less than 0.65 mol %, or less than 0.60 mol %, or less than 0.55 mol % as measured by FTIR or $^{13}C$ NMR methods, with $^{13}C$ NMR being preferred, where the comonomer is one or more suitable alpha olefins such as but not limited to 1-butene, 1-hexene, 1-octene and the like, with 1-octene being preferred. In another embodiment, the polyethylene composition has a comonomer content from 0.1 mol % to 0.75 mol %, or from 0.20 mol % to 0.55 mol %, or from 0.25 mol % to 0.50 mol %.

In embodiments, the polyethylene composition has a density from 0.930 g/cm³ to 0.970 g/cm³.

In an embodiment, the polyethylene composition has a density from 0.945 g/cm³ to 0.966 g/cm³.

In an embodiment, the polyethylene composition has a density from 0.949 g/cm³ to 0.962 g/cm³.

In an embodiment, the polyethylene composition has a melt index, $I_2$, of between 0.1 to 12 g/10 min according to ASTM D1238 (when conducted at 190° C., using a 2.16 kg weight) and including narrower ranges within this range. For example, in further embodiments, the polyethylene composition has a melt index, $I_2$, from 0.2 to 7 g/10 min, or from 0.3 to 4 g/10 min.

In an embodiment, the polyethylene composition or a molded article made from the polyethylene composition, has an environment stress crack resistance ESCR Condition B at 10% of 10 to 2000 hours, as measured according to ASTM D1693 (at 10% IGEPAL® and 50° C. under condition B), or for example 50 to 1000 hours, or for example 100-600 hours.

The polyethylene composition can be made using any conventional blending method such as but not limited to physical blending and in-situ blending by polymerization in multi reactor systems. For example, it is possible to perform the mixing of the first ethylene copolymer with the second ethylene copolymer by molten mixing of the two preformed polymers. Preferred are processes in which the first and second ethylene copolymers are prepared in at least two sequential polymerization stages, however, both in-series or an in-parallel dual reactor process are contemplated for use. Gas phase, slurry phase or solution phase reactor systems may be used, with solution phase reactor systems being preferred.

In an embodiment, a dual reactor solution process is used as has been described in for example U.S. Pat. No. 6,372,864 and U.S. Patent Application No. 20060247373A1.

Homogeneously branched ethylene copolymers can be prepared using any catalyst capable of producing homogeneous branching. Generally, the catalysts will be based on a group 4 metal having at least one cyclopentadienyl ligand that is well known in the art. Examples of such catalysts which include metallocenes, constrained geometry catalysts and phosphinimine catalysts are typically used in combination with activators selected from methylaluminoxanes, boranes or ionic borate salts and are further described in U.S. Pat. Nos. 3,645,992; 5,324,800; 5,064,802; 5,055,438; 6,689,847; 6,114,481 and 6,063,879. Such catalysts may also be referred to as "single site catalysts" to distinguish them from traditional Ziegler-Natta or Phillips catalysts which are also well known in the art. In general, single site catalysts produce ethylene copolymers having a molecular weight distribution ($M_w/M_n$) of less than about 3.0 and a composition distribution breadth index (CDBI) of greater than about 50%.

In an embodiment, homogeneously branched ethylene polymers are prepared using an organometallic complex of a group 3, 4 or 5 metal that is further characterized as having a phosphinimine ligand. Such catalysts are known generally as phosphinimine catalysts. Some non-limiting examples of phosphinimine catalysts can be found in U.S. Pat. Nos. 6,342,463; 6,235,672; 6,372,864; 6,984,695; 6,063,879; 6,777,509 and 6,277,931.

Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413. Some non-limiting examples of constrained geometry catalysts can be found in U.S. Pat. Nos. 5,057,475; 5,096,867; 5,064,802; 5,132,380; 5,703,187 and 6,034,021.

In an embodiment, use of a single site catalyst that does not produce long chain branching (LCB) is preferred. Without wishing to be bound by any single theory, long chain branching can increase viscosity at low shear rates, thereby negatively impacting cycle times during the manufacture of caps and closures, such during the process of compression molding. Long chain branching may be determined using $^{13}$C NMR methods and may be quantitatively assessed using the method disclosed by Randall in Rev. Macromol. Chem. Phys. C29 (2 and 3), p. 285.

In an embodiment, the polyethylene composition will contain fewer than 0.3 long chain branches per 1000 carbon atoms. In another embodiment, the polyethylene composition will contain fewer than 0.01 long chain branches per 1000 carbon atoms.

In an embodiment, the polyethylene composition (defined as above) is prepared by contacting ethylene and at least one alpha-olefin with a polymerization catalyst under solution phase polymerization conditions in at least two polymerization reactors (for an example of solution phase polymerization conditions see for example U.S. Pat. Nos. 6,372,864; 6,984,695 and U.S. Patent Application No. 20060247373A1).

In an embodiment, the polyethylene composition is prepared by contacting at least one single site polymerization catalyst system (comprising at least one single site catalyst and at least one activator) with ethylene and a least one comonomer (e.g. a C3-C8 alpha-olefin) under solution polymerization conditions in at least two polymerization reactors.

In an embodiment, a group 4 single site catalyst system, comprising a single site catalyst and an activator, is used in a solution phase dual reactor system to prepare a bimodal polyethylene composition by polymerization of ethylene in the presence of an alpha-olefin comonomer.

In an embodiment, a group 4 single site catalyst system, comprising a single site catalyst and an activator, is used in a solution phase dual reactor system to prepare a bimodal polyethylene composition by polymerization of ethylene in the presence of 1-octene.

In an embodiment, a group 4 phosphinimine catalyst system, comprising a phosphinimine catalyst and an activator, is used in a solution phase dual reactor system to prepare a bimodal polyethylene composition by polymerization of ethylene in the presence of an alpha-olefin comonomer.

In an embodiment, a group 4 phosphinimine catalyst system, comprising a phosphinimine catalyst and an activator, is used in a solution phase dual reactor system to prepare a bimodal polyethylene composition by polymerization of ethylene in the presence of 1-octene.

In an embodiment, a solution phase dual reactor system comprises two solution phase reactors connected in series.

In an embodiment, a polymerization process to prepare the polyethylene composition comprises contacting at least one single site polymerization catalyst system with ethylene and at least one alpha-olefin comonomer under solution polymerization conditions in at least two polymerization reactors.

In an embodiment, a polymerization process to prepare the polyethylene composition comprises contacting at least one single site polymerization catalyst system with ethylene and at least one alpha-olefin comonomer under solution polymerization conditions in a first reactor and a second reactor configured in series.

In an embodiment, a polymerization process to prepare the polyethylene composition comprises contacting at least one single site polymerization catalyst system with ethylene and at least one alpha-olefin comonomer under solution polymerization conditions in a first reactor and a second reactor configured in series, with the at least one alpha-olefin comonomer being fed exclusively to the first reactor.

The production of the polyethylene composition may include an extrusion or compounding step. Such steps are well known in the art.

The polyethylene composition can comprise further polymer components in addition to the first and second ethylene polymers. Such polymer components include polymers made in situ or polymers added to the polymer composition during an extrusion or compounding step.

Optionally, additives can be added to the polyethylene composition. Additives can be added to the polyethylene composition during an extrusion or compounding step, but other suitable known methods will be apparent to a person skilled in the art. The additives can be added as is or as part of a separate polymer component (i.e. not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide, and nucleating agents (including nucleators, pigments or any other chemicals which may provide a nucleating effect to the polyethylene composition). The additives that can be optionally added are typically added in amount of up to 20 wt. %.

One or more nucleating agent(s) may be introduced into the polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 µm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. The effectiveness of nucleation may be monitored microscopically by observation of the degree of reduction in size of the spherulites into which the crystallites are aggregated.

Part C: The Polyethylene Blend

The compositions described in Part B above can be used in a blend with the recycled polyethylene components described in Part A in the formation of molded articles. For example, articles formed by compression molding and injection molding are contemplated. Such articles include, for example, caps, screw caps, fitment closures, and closures for bottles. However, a person skilled in the art will readily appreciate that the compositions described above may also be used for other applications such as but not limited to film, injection blow molding, blow molding and sheet extrusion applications.

In some embodiments, the (bimodal) compositions described above may be used in the blends with PCR polyethylene to produce caps and closures having an excellent balance of properties.

Supplementary Additives

Some recycled polyethylene may be subjected to conditions that cause a degradation of the stabilizers/antioxidants that are contained in the polyethylene when it was new/virgin.

This example illustrates the investigation of various additives as "supplementary" additives that are intended to mitigate this problem. We have discovered that a blend of two different phosphites provides surprisingly good results.

Thus, in an embodiment, the supplementary additives include at least two phosphites: a monoaryl phosphite (described below); and a second phosphite that is different from the first phosphite and is elected from the group consisting of a diphosphite (described below); and a phosphite defined by the formula (I):

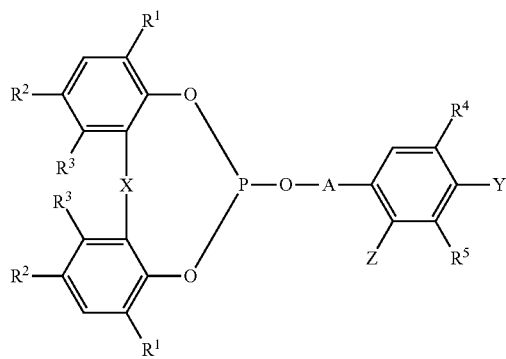

wherein $R^1$, $R^2$, $R^4$ and $R^5$ each independently denotes a hydrogen atom, an alkyl group having 1 to 8 carbon atoms, and $R^3$ denotes a hydrogen atom or an alkyl group having 1 to 8 carbon atoms; X denotes a single bond, a sulfur atom or a —$CHR^6$ group ($R^6$ denotes a hydrogen atom, an alkyl group having 1 to 8 carbon atoms or a cycloalkyl group having 5 to 8 carbon atoms); A denotes an alkylene group having 1 to 8 carbon atoms or a *—$COR^7$ group ($R^7$ denotes a single bond or an alkylene group having 1 to 8 carbon atoms, and * denotes a bonding hand on the side of oxygen); and one of Y and Z denotes a hydroxyl group, an alkoxy group having 1 to 8 carbon atoms or an aralkyloxy group having 7 to 12 carbon atoms, and the other one of Y and Z denotes a hydrogen atom or an alkyl group having 1 to 8 carbon atoms).

In an embodiment, this phosphite is 6-[3-(3-tert-butyl-4-hydroxy-5-methylphenyl)propoxy]-2,4,8,10-t-etra-tert-butyldibenzo[d,f][1,3,2] dioxaphospepin (CAS Reg. No. 203255-81-6) (SUMILIZER™ GP).

Monoaryl Phosphite

As used herein, the term aryl monophosphite refers to a phosphite stabilizer which contains only one phosphorus atom per molecule and at least one aryloxide (which may also be referred to as phenoxide) radical which is bonded to the phosphorus.

Preferred aryl monophosphites contain three aryloxide radicals—for example, tris phenyl phosphite is the simplest member of this preferred group of aryl monophosphites.

Highly preferred aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents).

Non-limiting examples of suitable aryl monophosphites follow. Preferred aryl monophosphites are indicated by the use of trademarks in square brackets.

Triphenyl phosphite; diphenyl alkyl phosphites; phenyl dialkyl phosphites; tris(nonylphenyl) phosphite [WESTON® 399, available from GE Specialty Chemicals]; tris(2,4-di-tert-butylphenyl) phosphite [IRGAFOS 168, available from Ciba Specialty Chemicals Corp. or from BASF]; and bis(2,4-di-tert-butyl-6-methylphenyl) ethyl phosphite [IRGAFOS 38, available from Ciba Specialty Chemicals Corp. or from BASF]; and 2,2',2''-nitrilo[triethyltris(3,3'5,5'-tetra-tert-butyl-1,1'-biphenyl-2,2'-diyl) phosphite [IRGAFOS 12, available from Ciba Specialty Chemicals Corp.].

As illustrated by data in the accompanying examples, the tertiary butyl substituted aryl phosphites are preferred.

In an embodiment, the amount of aryl monophosphite used in the present disclosure is from 200 to 2,000 ppm (based on the weight of the polyolefin), preferably from 300 to 1,500 ppm and most preferably from 400 to 1,000 ppm.

Diphosphite

As used herein, the term diphosphite refers to a phosphite stabilizer which contains at least two phosphorus atoms per phosphite.

Non-limiting examples of suitable diphosphites follow: distearyl pentaerythritol diphosphite, diisodecyl pentaerythritol diphosphite, bis(2,4 di-tert-butylphenyl) pentaerythritol diphosphite [ULTRANOX® 626, available from GE Specialty Chemicals or from Addivant/SI Group]; bis(2,6-di-tert-butyl-4-methylpenyl) pentaerythritol diphosphite; bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, and bis(2,4-dicumylphenyl)pentaerythritol diphosphite [DOVERPHOS® S9228-T or DOVERPHOS S9228-CT].

In an embodiment, the diphosphite is used in amounts from 200 ppm to 2,000 ppm, preferably from 300 to 1,500 ppm and most preferably from 400 to 1,000 ppm.

Formula (I)

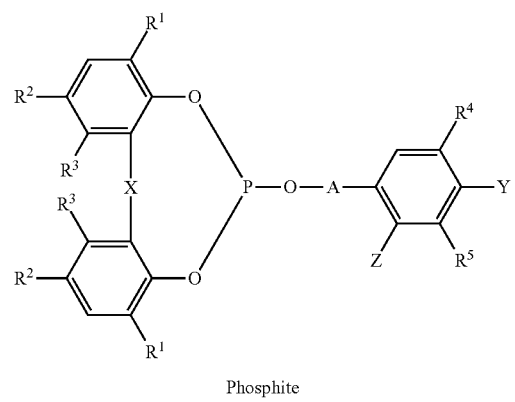

Phosphite wherein $R^1$, $R^2$, $R^4$ and $R^5$ each independently denotes a hydrogen atom, an alkyl group having 1 to 8 carbon atoms, and $R^3$ denotes a hydrogen atom or an alkyl group having 1 to 8 carbon atoms; X denotes a single bond, a sulfur atom or a —$CHR^6$ group ($R^6$ denotes a hydrogen atom, an alkyl group having 1 to 8 carbon atoms or a cycloalkyl group having 5 to 8 carbon atoms); A denotes an alkylene group having 1 to 8 carbon atoms or a *—$COR^7$ group ($R^7$ denotes a single bond or an alkylene group having 1 to 8 carbon atoms, and * denotes a bonding hand on the side of oxygen); and one of Y and Z denotes a hydroxyl group, an alkoxy group having 1 to 8 carbon atoms or an aralkyloxy group having 7 to 12 carbon atoms, and the other one of Y and Z denotes a hydrogen atom or an alkyl group having 1 to 8 carbon atoms).

In an embodiment, this phosphite is 6-[3-(3-tert-butyl-4-hydroxy-5-methylphenyl)propoxy]-2,4,8,10-t-etra-tert-butyldibenzo[d,f][1,3,2] dioxaphospepin (CAS Reg. No. 203255-81-6) (SUMILIZER™ GP).

In an embodiment, a closure (or cap) is a screw cap for a bottle.

The caps and closures can be made according to any known method, including for example injection molding and compression molding techniques that are well known to persons skilled in the art. Hence, in an embodiment a closure (or cap) including the polyethylene composition (defined above) is prepared with a process including at least one compression molding step and/or at least one injection molding step.

The caps and closures (including single piece or multi-piece variants) include the polyethylene composition described above and have good organoleptic properties, good toughness, as well as good ESCR values. Hence the closures and caps of the current disclosure are well suited for sealing bottles containing drinkable water, carbonated soft drinks and other foodstuffs, including but not limited to liquids that are under an appropriate pressure (i.e. carbonated beverages or appropriately pressurized drinkable liquids).

The invention is further illustrated by the following non-limiting examples.

EXAMPLES

Example 1: Preparation of Bimodal Polyethylene Compositions $M_n$, $M_w$, and $M_z$ (g/mol) were determined by high temperature Gel Permeation Chromatography (GPC) with differential refractive index (DRI) detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("$M_n$") and 5.0% for the weight average molecular weight ("$M_w$"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the $2^{nd}$ heating cycle.

The short chain branch frequency (SCB per 1000 carbon atoms) of copolymer samples was determined by Fourier Transform Infrared Spectroscopy (FTIR) as per the ASTM D6645-01 method. A Thermo-Nicolet 750 Magna-IR Spectrophotometer equipped with OMNIC® version 7.2a software was used for the measurements.

Comonomer content can also be measured using $^{13}C$ NMR techniques as discussed in Randall, Rev. Macromol. Chem. Phys., C29 (2&3), p 285; U.S. Pat. No. 5,292,845 and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model #D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

Melt indexes, $I_2$, $I_5$, $I_6$ and $I_{21}$ for the polyethylene composition were measured according to ASTM D1238 (when conducted at 190° C., using a 2.16 kg, a 5 kg, a 6.48 kg and a 21 kg weight respectively).

To determine CDBI, a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI is determined by establishing the weight percentage of a copolymer sample that has a comonomer content within 50% of the median comonomer content on each side of the median (See WO 93/03093 and U.S. Pat. No. 5,376,439).

The specific temperature rising elution fractionation (TREF) method used herein was as follows. Polymer samples (50 to 150 mg) were introduced into the reactor vessel of a crystallization-TREF unit (Polymer Char). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer Char software, Excel spreadsheet and TREF software developed in-house.

The melt index, $I_2$ and density of the first and second ethylene copolymers were estimated by GPC and GPC-FTIR deconvolutions as discussed further below.

High temperature GPC equipped with an online FTIR detector (GPC-FTIR) was used to measure the comonomer content as the function of molecular weight. Mathematical deconvolutions are performed to determine the relative amount of polymer, molecular weight and comonomer content of the component made in each reactor, by assuming that each polymer component follows a Flory's molecular weight distribution function and it has a homogeneous comonomer distribution across the whole molecular weight range.

For these single site catalyzed resins, the GPC data from GPC chromatographs was fit based on Flory's molecular weight distribution function.

To improve the deconvolution accuracy and consistency, as a constraint, the melt index, $I_2$, of the targeted resin was set and the following relationship was satisfied during the deconvolution:

$$Log_{10}(I_2)=22.326528+0.003467*[Log_{10}(M_n)]^3-4.322582*Log_{10}(M_w)-0.180061*[Log_{10}(M_z)]^2+0.026478*[Log_{10}(M_z)]^3$$

where the experimentally measured overall melt index, $I_2$, was used on the left side of the equation, while $M_n$ of each component ($M_w=2 \times M_n$ and $M_z=1.5 \times M_w$ for each component) was adjusted to change the calculated overall $M_n$, $M_w$ and $M_z$ of the composition until the fitting criteria were met. During the deconvolution, the overall $M_n$, $M_w$ and $M_z$ are calculated with the following relationships: $M_n=1/Sum(w_i/M_n(i))$, $M_w=Sum(w_i \times M_w(i))$, $M_z=Sum(w_i \times M_z(i)^2)$, where i represents the i-th component and $w_i$ represents the relative weight fraction of the i-th component in the composition.

The uniform comonomer distribution (which results from the use of a single site catalyst) of the resin components (i.e. the first and second ethylene copolymers) allowed the estimation of the short chain branching content (SCB) from the GPC-FTIR data, in branches per 1000 carbon atoms and calculation of comonomer content (in mol %) and density (in g/cm³) for the first and second ethylene copolymers, based on the deconvoluted relative amounts of first and second ethylene copolymer components in the polyethylene composition, and their estimated resin molecular weight parameters from the above procedure.

A component (or composition) density model and a component (or composition) melt index, $I_2$, model was used according to the following equations to calculate the density and melt index $I_2$ of the first and second ethylene polymers:

$$density=0.979863-0.00594808*(FTIR\ SCB/1000C)^{0.65}-0.000383133*[Log_{10}(M_n)]^3-0.00000577986*(M_w/M_n)^3+0.00557395*(M_z/M_w)^{0.25};$$

$$Log_{10}(melt\ index, I_2)=22.326528+0.003467*[Log_{10}(M_n)]^3-4.322582*Log_{10}(M_w)-0.180061*[Log_{10}(M_z)]^2+0.026478*[Log_{10}(M_z)]^3$$

where the $M_n$, $M_w$ and $M_z$ were the deconvoluted values of the individual ethylene polymer components, as obtained from the results of the above GPC deconvolutions. Hence, these two models were used to estimate the melt indexes and the densities of the components (i.e. the first and second ethylene copolymers).

Plaques molded from the polyethylene compositions were tested according to the following ASTM methods: Bent Strip Environmental Stress Crack Resistance (ESCR) at Condition B at 10% IGEPAL® at 50° C., ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity ($\eta^*$) were obtained as a function of frequency. The same rheological data can also be obtained by using a 25 mm diameter parallel plate geometry at 190° C. under nitrogen atmosphere. The SHI(1,100) value is calculated according to the methods described in WO 2006/048253 and WO 2006/048254.

Examples of the polyethylene compositions were produced in a dual reactor solution polymerization process in which the contents of the first reactor flow into the second reactor. This in-series "dual reactor" process produces an "in-situ" polyethylene blend (i.e. the polyethylene composition). Note, that when an in-series reactor configuration is used, un-reacted ethylene monomer, and un-reacted alpha-olefin comonomer present in the first reactor will flow into the downstream second reactor for further polymerization.

In the present examples, although no co-monomer is fed directly to the downstream second reactor, an ethylene copolymer is nevertheless formed in second reactor due to the significant presence of un-reacted 1-octene flowing from the first reactor to the second reactor where it is copolymerized with ethylene. Each reactor is sufficiently agitated to give conditions in which components are well mixed. The volume of the first reactor was 12 liters and the volume of the second reactor was 22 liters. These are the pilot plant scales. The first reactor was operated at a pressure of 10500 to 35000 kPa and the second reactor was operated at a lower pressure to facilitate continuous flow from the first reactor to the second. The solvent employed was methylpentane. The process operates using continuous feed streams. The catalyst employed in the dual reactor solution process experiments was a titanium complex having a phosphinimine ligand, a cyclopentadienide ligand and two activatable ligands, such as but not limited to chloride ligands. A boron-based co-catalyst was used in approximately stoichiometric amounts relative to the titanium complex. Commercially available methylaluminoxane (MAO) was included as a scavenger at an Al:Ti of about 40:1. In addition, 2,6-di-tert-butylhydroxy-4-ethylbenzene was added to scavenge free trimethylaluminum within the MAO in a ratio of Al:OH of about 0.5:1.

The polymerization conditions used to make the compositions are provided in Table 1.

Bimodal polyethylene composition properties are described in Tables 2. For convenience, the term "resin" is used instead of "bimodal polyethylene composition" (using terminology that is commonly used by those skilled in the art).

Calculated properties for the first ethylene copolymer and the second ethylene copolymer for selected comparative and inventive polyethylene compositions, as obtained from GPC-FTIR deconvolution studies, are provided in Table 3.

The properties of pressed plaques made from comparative and inventive polyethylene compositions are provided in Table 4.

The polyethylene compositions of Examples 1-9 are made using a single site phosphinimine catalyst in a dual reactor solution process as described above and have an ESCR at condition B10 of greater than 20 hours and a SCB1/SCB2 ratio of greater than 0.50. These compositions also have a $M_z$ values of less than 400,000.

TABLE 1

| Reactor Conditions | | | | | |
|---|---|---|---|---|---|
| | Example No. | | | | |
| | Example 1 | Example 2 | Example 3 | Example 4 | Example 5 |
| Reactor 1 | | | | | |
| Ethylene (kg/h) | 35.6 | 38.1 | 35.7 | 36.7 | 37.5 |
| Octene (kg/h) | 4.9 | 4 | 5.3 | 4.1 | 4.8 |
| Hydrogen (g/h) | 0.51 | 0.58 | 0.51 | 0.50 | 0.50 |
| Solvent (kg/h) | 319.2 | 329 | 296.5 | 296.8 | 286.8 |
| Reactor Feed Inlet Temperature (° C.) | 30 | 30 | 30 | 30 | 30 |
| Reactor Temperature (° C.) | 138.2 | 140.5 | 141.1 | 143.8 | 149.2 |
| Titanium Catalyst (ppm) | 0.14 | 0.10 | 0.12 | 0.1 | 0.1 |
| Reactor 2 | | | | | |
| Ethylene (kg/h) | 43.6 | 51.6 | 43.6 | 44.9 | 45.9 |
| Octene (kg/h) | 0 | 0 | 0 | 0 | 0 |
| Hydrogen (g/h) | 22.2 | 13.46 | 22.2 | 16.4 | 21 |
| Solvent (kg/h) | 106.7 | 137.2 | 129.1 | 127.5 | 135 |

TABLE 1-continued

| Reactor Conditions | | | | | |
|---|---|---|---|---|---|
| Reactor Feed Inlet Temperature (° C.) | 30 | 30 | 30 | 31.3 | 29.8 |
| Reactor Temperature (° C.) | 186.9 | 192.1 | 186.3 | 190.9 | 194 |
| Titanium Catalyst (ppm) | 0.29 | 0.23 | 0.21 | 0.21 | 0.24 |

| | Example No. | | | |
|---|---|---|---|---|
| | Example 6 | Example 7 | Example 8 | Example 9 |
| Reactor 1 | | | | |
| Ethylene (kg/h) | 35.7 | 35.6 | 35.7 | 38.4 |
| Octene (kg/h) | 2.6 | 4.7 | 4.9 | 1.5 |
| Hydrogen (g/h) | 0.45 | 0.46 | 0.46 | 0.62 |
| Solvent (kg/h) | 256.6 | 259.1 | 258.9 | 346.3 |
| Reactor Feed Inlet Temperature (° C.) | 30 | 30 | 30 | 30 |
| Reactor Temperature (° C.) | 152.5 | 151 | 147 | 141.1 |
| Titanium Catalyst (ppm) | 0.08 | 0.13 | 0.10 | 0.10 |
| Reactor 2 | | | | |
| Ethylene (kg/h) | 43.6 | 43.6 | 43.6 | 51.9 |
| Octene (kg/h) | 0 | 0 | 0 | 0 |
| Hydrogen (g/h) | 10.2 | 21.59 | 16.21 | 15.07 |
| Solvent (kg/h) | 171.6 | 167 | 167.1 | 121.7 |
| Reactor Feed Inlet Temperature (° C.) | 30 | 30 | 30 | 30 |
| Reactor Temperature (° C.) | 185.7 | 186.2 | 186.4 | 192.8 |
| Titanium Catalyst (ppm) | 0.13 | 0.22 | 0.20 | 0.31 |

TABLE 2

| Resin Properties | | | | |
|---|---|---|---|---|
| | Example No. | | | |
| | Example 1 | Example 2 | Example 3 | Example 4 |
| Density (g/cm³) | 0.9529 | 0.9524 | 0.9524 | 0.9523 |
| Rheology/Flow Properties | | | | |
| Melt Index $I_2$ (g/10 min) | 1.57 | 2.94 | 1.69 | 1.5 |
| Melt Flow Ratio ($I_{21}/I_2$) | 58 | 44.1 | 61 | 54.8 |
| Stress Exponent | 1.38 | 1.36 | 1.38 | 1.4 |
| $I_{21}$ (g/10 min) | 90 | 129 | 104 | 82.3 |
| $I_5$ (g/10 min) | 4.72 | | 4.94 | 4.5 |
| $I_{21}/I_5$ | 19.07 | | 21.05 | 18.29 |
| Shear Viscosity at $10^5$ s$^{-1}$ (240° C., Pa-s) | 5.1 | 6.2 | 4.8 | 5.8 |
| Shear Viscosity Ratio $\eta(10$ s$^{-1})/\eta(1000$ s$^{-1})$ at 240° C. | 13.5 | 8.1 | 13.0 | 14.8 |
| DMA Data (190° C.) | $\eta^*$ = 5294 Pa*s at G* = 2.647 kPa; $\eta^*$ = 5106 Pa*s at G* = 3.547 kPa | | $\eta^*$ = 4889 Pa*s at G* = 2.445 kPa; $\eta^*$ = 4739 Pa*s at G* = 3.292 kPa | |
| GPC | | | | |
| $M_n$ | 10524 | 15679 | 10579 | 13309 |
| $M_w$ | 83712 | 74090 | 86319 | 88295 |
| $M_z$ | 256210 | 215369 | 291056 | 278141 |
| Polydispersity Index ($M_w/M_n$) | 7.95 | 4.73 | 8.16 | 6.63 |
| $M_z/M_w$ | 3.06 | 2.91 | 3.37 | 3.15 |
| Branch Frequency - FTIR (uncorrected for chain end —CH$_3$) | | | | |
| Uncorrected SCB/1000 C | 3 | 1.8 | 3 | 2.1 |
| Uncorrected comonomer content (mol %) | 0.6 | 0.4 | 0.6 | 0.4 |

TABLE 2-continued

| Resin Properties | | | | |
|---|---|---|---|---|
| Comonomer ID | octene | octene | octene | octene |
| Comonomer mol % measured by $^{13}$C-NMR | | | | |
| Hexyl + branches(≥4 carbon atoms), mol % | 0.4 | | 0.4 | 0.3 |
| Slow-CTREF | | | | |
| CDBI$_{50}$(%) | 81.8 | 86.2 | 80.4 | 76.5 |
| DSC | | | | |
| Primary Melting Peak (° C.) | 127.3 | 128.8 | 127.5 | 129 |
| Heat of Fusion (J/g) | 203.8 | 206.1 | 207.3 | 209 |
| Crystallinity (%) | 70.27 | 71.08 | 71.48 | 72.08 |
| Other Properties | | | | |
| Hexane Extractables (wt %) | 0.36 | 0.22 | 0.42 | 0.25 |
| VICAT Soft. Pt. (° C.) - Plaque | 125.2 | 126.8 | 124.8 | 126.4 |
| Heat Deflection Temp. [C.] @ 66 PSI | 68 | 74.1 | 76 | 67.3 |

| | Example No. | | | | |
|---|---|---|---|---|---|
| | Example 5 | Example 6 | Example 7 | Example 8 | Example 9 |
| Density (g/cm$^3$) | 0.9532 | 0.9527 | 0.9534 | 0.9522 | 0.9568 |
| Rheology/Flow Properties | | | | | |
| Melt Index I$_2$ (g/10 min) | 1.78 | 1.29 | 2.05 | 1.31 | 1.68 |
| Melt Flow Ratio (I$_{21}$/I$_2$) | 55.6 | 44.1 | 55 | 64 | 54.2 |
| Stress Exponent | 1.37 | 1.35 | 1.34 | 1.39 | 1.40 |
| I$_{21}$ (g/10 min) | 99.1 | 57 | 113 | 83 | 91 |
| I$_5$ (g/10 min) | 5.33 | | 6.21 | | |
| I$_{21}$/I$_5$ | 18.59 | | 18.20 | | |
| Shear Viscosity at $10^5$ s$^{-1}$ (240° C., Pa-s) | 5.1 | 6.3 | 5.0 | 5.8 | 6.0 |
| Shear Viscosity Ratio η(10 s$^{-1}$)/η(1000 s$^{-1}$) at 240° C. | 13.3 | 11.6 | 12.1 | 14.8 | 11.2 |
| DMA Data (190° C.) | | η* = 6707 Pa*s at G* = 2.413 kPa; η* = 6465 Pa*s at G* = 3.232 kPa | | η* = 6688 Pa*s at G* = 2.407 kPa; η* = 6472 Pa*s at G* = 3.236 kPa | |
| GPC | | | | | |
| M$_n$ | 9716 | 18449 | 11145 | 14021 | 15110 |
| M$_w$ | 84943 | 93080 | 80630 | 93175 | 85227 |
| M$_z$ | 288665 | 272788 | 243944 | 303823 | 287035 |
| Polydispersity Index (M$_w$/M$_n$) | 8.74 | 5.05 | 7.23 | 6.65 | 5.64 |
| M$_z$/M$_w$ | 3.40 | 2.93 | 3.03 | 3.26 | 3.37 |
| Branch Frequency - FTIR (uncorrected for chain end —CH$_3$) | | | | | |
| Uncorrected SCB/1000 C | 2.5 | 1.7 | 2.8 | 2.2 | 1.3 |
| Uncorrected comonomer content (mol %) | 0.5 | 0.3 | 0.6 | 0.4 | 0.3 |
| Comonomer ID | octene | octene | octene | octene | octene |
| Comonomer mol % measured by $^{13}$C-NMR | | | | | |
| Hexyl + branches (>=4 carbon atoms), mol % | | | | | |
| Slow-CTREF | | | | | |
| CDBI$_{50}$ (%) | 75.2 | 86.2 | 79.7 | 80.4 | 77.8 |
| DSC | | | | | |
| Primary Melting Peak (° C.) | 128.3 | 129.8 | 127.9 | 128.4 | 130.7 |
| Heat of Fusion (J/g) | 207.3 | 208.5 | 211.1 | 205.4 | 213.8 |
| Crystallinity (%) | 71.48 | 71.9 | 72.8 | 70.82 | 73.73 |

TABLE 2-continued

| Resin Properties | | | | | |
|---|---|---|---|---|---|
| Other Properties | | | | | |
| Hexane Extractables (wt %) | 0.33 | 0.25 | 0.38 | 0.27 | 0.24 |
| VICAT Soft. Pt. (° C.) - Plaque | 125.4 | 128.2 | 125.2 | 126.2 | 128.4 |
| Heat Deflection Temp. [C.] @ 66 PSI | 69.8 | 68.2 | 66.8 | 69 | 77.6 |

TABLE 3

| Polyethylene Component Properties | | | | |
|---|---|---|---|---|
| | Example No. | | | |
| | Inventive Example 3 | Inventive Example 4 | Inventive Example 5 | Inventive Example 7 |
| Density (g/cm$^3$) | 0.9524 | 0.9523 | 0.9532 | 0.9534 |
| I$_2$ (g/10 min.) | 1.69 | 1.5 | 1.78 | 2.05 |
| Stress Exponent | 1.38 | 1.4 | 1.37 | 1.34 |
| MFR (I$_{21}$/I$_2$) | 61 | 54.8 | 55.6 | 55 |
| Mw/Mn | 8.16 | 6.63 | 8.74 | 7.23 |
| 1$^{st}$ Ethylene Copolymer | | | | |
| weight % | 0.455 | 0.454 | 0.454 | 0.453 |
| Mw | 165100 | 168100 | 162700 | 157200 |
| I$_2$ (g/10 min.) | 0.13 | 0.12 | 0.13 | 0.15 |
| Density 1, d1 (g/cm$^3$) | 0.9325 | 0.9302 | 0.9322 | 0.9316 |
| SCB1 per 1000Cs | 1.57 | 2.24 | 1.71 | 2.02 |
| mol % octene | 0.31 | 0.45 | 0.34 | 0.40 |
| 2$^{nd}$ Ethylene Copolymer | | | | |
| weight % | 0.545 | 0.546 | 0.546 | 0.547 |
| Mw | 11100 | 14900 | 12100 | 11400 |
| I$_2$ (g/10 min.) | 6318 | 1817 | 4419 | 5739 |
| Density 2, d2 (g/cm$^3$) | 0.9614 | 0.9555 | 0.959 | 0.9577 |
| SCB2 per 1000Cs | 0.63 | 1.64 | 1.08 | 1.59 |
| mol % octene | 0.13 | 0.33 | 0.22 | 0.32 |
| Estimated (d2 − d1), g/cm$^3$ | 0.0289 | 0.0253 | 0.0268 | 0.0261 |
| Estimated (SCB2 − SCB1) | −0.94 | −0.6 | −0.63 | −0.43 |
| SCB1/SCB2 | 2.5 | 1.37 | 1.58 | 1.27 |

TABLE 4

| Example No. | Example 1 | Example 2 | Example 3 | Example 4 |
|---|---|---|---|---|
| Environmental Stress Crack Resistance | | | | |
| ESCR Cond. B at 10% (hrs) | 309 | 23 | 212 | 86 |
| Flexural Properties (Plaques) | | | | |
| Flex Secant Mod. 1% (MPa) | 1274 | 1247 | 1267 | 1295 |
| Flex Sec Mod 1% (MPa) Dev. | 39 | 44 | 19 | 23 |
| Flex Secant Mod. 2% (MPa) | 1064 | 1035 | 1060 | 1085 |
| Flex Sec Mod 2% (MPa) Dev. | 29 | 33 | 14 | 21 |
| Flexural Strength (MPa) | 37.5 | 36.7 | 37.1 | 37.3 |
| Flexural Strength Dev. (MPa) | 0.8 | 0.4 | 0.3 | 0.4 |
| Tensile Properties (Plaques) | | | | |
| Elong. at Yield (%) | 9 | 10 | 8 | 10 |
| Elong. at Yield Dev. (%) | 1 | 1 | 0 | 0 |
| Yield Strength (MPa) | 26 | 25.6 | 26.4 | 26.3 |
| Yield Strength Dev. (MPa) | 0.2 | 0.1 | 0.3 | 0.3 |
| Ultimate Elong. (%) | 701 | 988 | 762 | 891 |
| Ultimate Elong. Dev. (%) | 106 | 58 | 98 | 23 |
| Ultimate Strength (MPa) | 21.8 | 32.2 | 24.7 | 33.3 |
| Ultimate Strength Dev. (MPa) | 6.8 | 1.9 | 7.4 | 2 |
| Sec Mod 1% (MPa) | 1483 | 1256 | 1331 | 1230 |

TABLE 4-continued

| | | | | |
|---|---|---|---|---|
| Sec Mod 1% (MPa) Dev. | 121 | 333 | 241 | 90 |
| Sec Mod 2% (MPa) | 973 | 880 | 939 | 913 |
| Sec Mod 2% (MPa) Dev. | 33 | 88 | 62 | 34 |
| Impact Properties (Plaques) | | | | |
| Notched Izod Impact (J/m) | 74.7 | 69.4 | 69.4 | 80.1 |
| IZOD DV (J/m) | 0.0 | 0.0 | 0.0 | 2.7 |

| Example No. | Example 5 | Example 6 | Example 7 | Example 8 | Example 9 |
|---|---|---|---|---|---|
| Environmental Stress Crack Resistance | | | | | |
| ESCR Cond. B at 10% (hrs) | 83 | 60 | 73 | 157 | 24 |
| Flexural Properties (Plaques) | | | | | |
| Flex Secant Mod. 1% (MPa) | 1304 | 1240 | 1318 | 1260 | 1402 |
| Flex Sec Mod 1% (MPa) Dev. | 57 | 31 | 37 | 25 | 48 |
| Flex Secant Mod. 2% (MPa) | 1092 | 1026 | 1098 | 1049 | 1159 |
| Flex Sec Mod 2% (MPa) Dev. | 40 | 26 | 24 | 15 | 35 |
| Flexural Strength (MPa) | 37.6 | 36.1 | 38.2 | 36.9 | 39.8 |
| Flexural Strength Dev. (MPa) | 0.8 | 0.6 | 0.3 | 0.6 | 1.1 |
| Tensile Properties (Plaques) | | | | | |
| Elong. at Yield (%) | 9 | 10 | 8 | 9 | 10 |
| Elong. at Yield Dev. (%) | 0 | 0 | 0 | 1 | 0 |
| Yield Strength (MPa) | 26.4 | 25.6 | 26.9 | 26.1 | 28.2 |
| Yield Strength Dev. (MPa) | 0.2 | 0.2 | 0.2 | 0.2 | 0.6 |
| Ultimate Elong. (%) | 862 | 974 | 766 | 836 | 923 |
| Ultimate Elong. Dev. (%) | 47 | 35 | 130 | 103 | 104 |
| Ultimate Strength (MPa) | 29.7 | 36.3 | 22.9 | 29.6 | 26.9 |
| Ultimate Strength Dev. (MPa) | 2.7 | 1.5 | 7 | 5.5 | 6.9 |
| Sec Mod 1% (MPa) | 1197 | 1333 | 1429 | 1395 | 1367 |
| Sec Mod 1% (MPa) Dev. | 128 | 213 | 183 | 217 | 190 |
| Sec Mod 2% (MPa) | 881 | 893 | 979 | 934 | 966 |
| Sec Mod 2% (MPa) Dev. | 40 | 70 | 52 | 73 | 67 |
| Impact Properties (Plaques) | | | | | |
| Notched Izod Impact (J/m) | 64.1 | 128.1 | 64.1 | 80.1 | 90.7 |
| IZOD DV (J/m) | 2.1 | 5.3 | 0.0 | 0.0 | 5.3 |

As can be seen from the data provided in Tables 2, 3 and 4, the polyethylene compositions of examples 1-9 which have a ratio of short chain branching SCB1/SCB2 of greater than 0.5, have improved ESCR B properties while maintaining good processability.

Example 2: Preparation of Caps from Blends of "Virgin" Polyethylene and PCR

This example describes the preparation of bottle caps from blends of virgin polyethylene and PCR.

Part 1: Molding of Caps

The materials used in this example are described below:

PCR resin, a recycled high density polyethylene resin with a density of 0.958 g/cm$^3$ and a melt index, $I_2$, of 0.7 g/10 min.

Resin 1, a bimodal high density polyethylene resin with a density of 0.955 g/cm$^3$ and a melt index, $I_2$, of 1.5 g/10 min.

Resin 2, a bimodal high density polyethylene resin with a density of 0.957 g/cm$^3$ and a melt index, $I_2$, of 0.5 g/10 min.

Resin 3, a bimodal high density polyethylene resin with a density of 0.954 g/cm$^3$ and a melt index, $I_2$, of 1.1 g/10 min. This example was prepared according to the procedures described in example 1.

Resin 4, a bimodal high density polyethylene resin with a density of 0.954 g/cm$^3$ and a melt index, $I_2$, of 0.7 g/10 min.

Resin 5, a unimodal high density polyethylene resin with a density of 0.954 g/cm$^3$ and a melt index, $I_2$, of 0.4 g/10 min.

Resin 6, a bimodal high density polyethylene resin with a density of 0.955 g/cm$^3$ and a melt index, $I_2$, of 7.1 g/10 min.

Resin 7, a unimodal high density polyethylene resin with a density of 0.953 g/cm$^3$ and a melt index, $I_2$, of 65 g/10 min.

Resin 8, a unimodal high density polyethylene resin with a density of 0.948 g/cm$^3$ and a melt index, $I_2$, of 16.4 g/10 min.

Resin 9, a unimodal high density polyethylene resin with a density of 0.949 g/cm$^3$ and a melt index, $I_2$, of 31.5 g/10 min.

Carbonated soft drink closures were made with these resins, and with blends of these resins, according to the formulations shown in Table 2.1. The closures were prepared in a 24 station SACMI compression molding machine.

TABLE 2.1

| Resin Name | Density (g/cm$^3$) | MI2 (g/10 min) |
|---|---|---|
| PCR Resin | 0.958 | 0.7 |
| Resin 1 | 0.955 | 1.5 |
| Resin 1 + 30% PCR | 0.956 | 1.2 |
| Resin 1 + 50% PCR | 0.957 | 1.0 |
| Resin 2 | 0.957 | 0.5 |
| Resin 2 + 30% PCR | 0.958 | 0.5 |
| Resin 3 | 0.954 | 1.1 |
| Resin 3 + 30% PCR | 0.956 | 0.9 |
| Resin 3 + 50% PCR | 0.957 | 0.8 |
| Resin 4 | 0.954 | 0.7 |
| Resin 4 + 30% PCR | 0.958 | — |
| Resin 5 | 0.954 | 0.4 |
| Resin 5 + 30% PCR | 0.958 | 0.4 |
| Resin 6 | 0.955 | 7.1 |
| Resin 6 + 30% PCR | 0.958 | 3.7 |
| Resin 7 | 0.953 | 6.5 |

TABLE 2.1-continued

| Resin Name | Density (g/cm³) | MI2 (g/10 min) |
|---|---|---|
| Resin 7 + 30% PCR | 0.957 | 3.2 |
| Resin 8 | 0.948 | 16.4 |
| Resin 8 + 30% PCR | 0.952 | 6.6 |
| Resin 9 | 0.949 | 31.5 |
| Resin 9 + 30% PCR | 0.952 | 8.5 |

Part 2: Environmental Stress Crack Resistance (ESCR) Testing

The ESCR of the compositions from Part 1 were tested according to ASTM D1693. The results are provided in Table 2.2.

TABLE 2.2

| Resin Name | Density (g/cm³) | MI2 (g/10 min) | B10 ESCR (hours) | B100 ESCR (hours) |
|---|---|---|---|---|
| PCR Resin | 0.958 | 0.7 | 19 | 15 |
| Resin 1 | 0.955 | 1.5 | 189 | — |
| Resin 1 + 30% PCR | 0.956 | 1.2 | 40 | — |
| Resin 1 + 50% PCR | 0.957 | 1.0 | 7-22 | — |
| Resin 2 | 0.957 | 0.5 | 75-139 | — |
| Resin 2 + 30% PCR | 0.958 | 0.5 | 29 | — |
| Resin 3 | 0.954 | 1.1 | 167 | — |
| Resin 3 + 30% PCR | 0.956 | 0.9 | 32-46 | — |
| Resin 3 + 50% PCR | 0.957 | 0.8 | 7-22 | — |
| Resin 4 | 0.954 | 0.7 | 354 | — |
| Resin 4 + 30% PCR | 0.958 | — | 61 | — |
| Resin 5 | 0.954 | 0.4 | 41 | — |
| Resin 5 + 30% PCR | 0.958 | 0.4 | 6-21 | — |
| Resin 6 | 0.955 | 7.1 | — | 6-21 |
| Resin 6 + 30% PCR | 0.958 | 3.7 | — | 7 |
| Resin 7 | 0.953 | 6.5 | — | 4 |
| Resin 7 + 30% PCR | 0.957 | 3.2 | — | 4 |

Part 3: Pressure Retention Testing

Simulated transportation testing was conducted on caps made with resins, and with blends of resins, as per Part 1: Molding of Caps, according to the formulations shown in Table 2.3.

TABLE 2.3

| Resin Name | Density (g/cm³) | MI2 (g/10 min) |
|---|---|---|
| Resin 3 | 0.954 | 1.1 |
| Resin 3 + 30% PCR | 0.956 | 0.9 |
| Resin 3 + 50% PCR | 0.957 | 0.8 |
| PCR Resin | 0.958 | 0.7 |

The simulated transportation performance of the caps made with the blends in Table 2.3 is described as follows. Twelve 20 ounce capacity polyethylene terephthalate (PET) bottles were filled and carbonated to 4.2 gas volumes using a citric acid and sodium bicarbonate mixture. Each bottle was capped to 18 inch-pounds (in-lb) of torque using a Steinfurth Torque Measuring System 5000 creating a capped package. The now capped packages were immediately placed in a 60° C. chamber for 6 hours. Upon completion of the 6 hour exposure, this chamber was reduced in temperature to 32° C. for 18 hours. This cycle was repeated two additional times for a total of three cycles. Upon completion of the elevated temperature cycle exposure, the pressure in each package was tested after a 24 hour equilibration period at room temperature. The test procedure for measuring pressure used was the Zahm Nagel test published by the International Society for Beverage Technologists ("ISBT"); revision 1; issued 10/03: Test Method for Plastic Top Closures. The average pressure results from each closure type as measured by the Zahm Nagel test are provided in Table 2.4.

TABLE 2.4

| Resin Name | Pressure (PSI) |
|---|---|
| Resin 3 | 37.5 |
| Resin 3 + 30% PCR | 39.7 |
| Resin 3 + 50% PCR | 36.3 |
| PCR Resin | 29 |

Part 4: Pressure Retention

Pressure retention performance testing was conducted on caps made with resins, and with blends of resins, as per Part 1: Molding of Caps, according to the formulations shown in Table 2.5.

TABLE 2.5

| Resin Name | Density (g/cm³) | MI2 (g/10 min) |
|---|---|---|
| Resin 3 | 0.954 | 1.1 |
| Resin 3 + 30% PCR | 0.956 | 0.9 |
| Resin 5 | 0.954 | 0.4 |
| Resin 5 + 30% PCR | 0.958 | 0.4 |

The pressure retention performance of the caps made with blends in Table 2.5 was performed as follows. Twelve 20 oz capacity PET bottles of each formulation shown in Table 2.5 were filled and carbonated to 4.2 gas volumes using a citric acid and sodium bicarbonate mixture. Each bottle was capped to 18 inch-pounds (in-lb) of torque using a Steinfurth Torque Measuring System 5000, creating a package. The now capped packages were immediately placed in a 50° C. chamber and held for 30 days. Each package was checked once a day for physical failure. If failure occurred, the time to failure was recorded. After 30 days, the packages were removed and the closures that had not failed were recorded to have a >720 hour life. The time to failure in hours for each package is shown in Table 2.6.

TABLE 2.6

| Package # | Resin 3 | Resin 3 + 30% PCR | Resin 5 | Resin 5 + 30% PCR |
|---|---|---|---|---|
| 1 | >720 | >720 | >720 | >720 |
| 2 | >720 | >720 | 576 | 72 |
| 3 | >720 | >720 | >720 | 216 |
| 4 | >720 | >720 | 600 | 72 |
| 5 | >720 | >720 | >720 | 240 |
| 6 | >720 | >720 | >720 | 168 |
| 7 | >720 | >720 | 360 | 96 |
| 8 | >720 | 483 | >720 | 168 |
| 9 | >720 | 483 | 672 | >720 |
| 10 | >720 | >720 | >720 | 96 |
| 11 | >720 | >720 | >720 | 96 |
| 12 | >720 | >720 | >720 | >720 |

Part 5: Accelerated Pressure Retention Performance

Accelerated pressure retention performance testing was conducted on caps made with resins, and with blends of resins, as per Part 1: Molding of Caps, according to the formulations shown in Table 2.5 above.

The accelerated (via IGEPAL) pressure retention performance of the caps made with the blends in Table 2.5 was performed as follows. Sixteen pre-form PET bottles of each formulation shown in Table 2.5 were capped to 18 in-lb of torque using a Steinfurth Torque Measuring System 5000, creating a package. The pre-form PET bottles had been pre-drilled through the bottom to fit a sealed quick-connect fitting for pressurizing the pre-forms via a Steinfurth Interactively Programmable Pressure Sequencer (IPPS). Each package was affixed to a Steinfurth IPPS via the attached quick-connect fitting, and the entire unit was placed in an oven at 38° C., oriented to place the closures at the bottom. The apparatus was arranged to place each closure in a cup which was filled with 10% IGEPAL in water. Each pre-form was then pressurized to 5.5 bar using the Steinfurth IPPS, and the equipment monitored the pressure as the experiment proceeded. Failure occurred when pressure was lost and could not be recovered and held after five attempts. The time to failure in hours was recorded. The results from this experiment are shown in Table 2.7.

TABLE 2.7

| Package # | Resin 3 | Resin 3 + 30% PCR | Resin 5 | Resin 5 + 30% PCR |
|---|---|---|---|---|
| 1 | 283 | 124 | 51 | 39 |
| 2 | 189 | 87 | 44 | 32 |
| 3 | 294 | 107 | 34 | 37 |
| 4 | 281 | 75 | 47 | 29 |
| 5 | 231 | 79 | 50 | 30 |
| 6 | 286 | 80 | 44 | 30 |
| 7 | 202 | 110 | 54 | 25 |
| 8 | 228 | 136 | 52 | 34 |
| 9 | 318 | 72 | 53 | 46 |
| 10 | 224 | 96 | 49 | 30 |
| 11 | 209 | 124 | 52 | 29 |
| 12 | 216 | 99 | 44 | 16 |
| 13 | 326 | 90 | 50 | 31 |
| 14 | 309 | 72 | 49 | 31 |
| 15 | 181 | 125 | 48 | 36 |
| 16 | 216 | 101 | 56 | 33 |

Example 3: Blends of Bimodal Polyethylene Compositions and PCR with Enhanced Stabilization This example illustrates the investigation of various additives as "supplementary" additives. We have discovered that a blend of two different phosphites provides surprisingly good results.

A series of small-scale experiments were completed to investigate the performance of various stabilizers as supplementary additives for blends of virgin polyethylene and post-consumer recycled polyethylene. The experiments were undertaken in a fusion-head mixer (manufactured by C.W. Brabender Instruments, Inc.) equipped with roller mixing blades in a mixing bowl having a 40 cc capacity. The stabilizer formulations (shown in Table 1) were mixed in the fusion-head mixer for a period of 10 minutes at 190° C. exposed to air in order to partially degrade the polymers to differentiate performance of the various blends.

The polyethylene resins used are described below.
1. "ECOPRIME" PCR (sold by Envision; $I_2$ reported to be from 0.55 to 0.85 g/10 minutes; density=0.958 to 0.965 g/cc). "PCR" in Table 3.1.
2. Resin 3 from Example 2: $I_2$=1.12 grams/10 minutes; density=0.954 g/cc) "PE" in Table 3.1.
Additives
AO1=AO1 a hindered phenolic primary antioxidant: Octadecyl 3-(3,5-di-tert-butyl-4-hydroxyphenyl)propionate (CAS Reg. No. 2082-79-3) (IRGANOX 1076) P1=Tris(2-4-di-tert-butylphenyl)phosphite (CAS Reg. No. 31570-04-4) (IRGAFOS 168);
P2=6-[3-(3-tert-butyl-4-hydroxy-5-methylphenyl)propoxy]-2,4,8,10-tetra-tert-butyldibenzo[d,f][1,3,2] dioxaphospepin (CAS Reg. No. 203255-81-6) (SUMILIZER™ GP)— within the definition of formula (I), above;
P3=bis(2,4,6-tri-tert-butylphenyl) pentaerythritol diphosphite, and bis(2,4-dicumylphenyl)pentaerythritol diphosphite [sold under the Trademarks DOVERPHOS 59228-T and DOVERPHOS S9228-CT by Dover Chemicals Corporation].

Example C1 was prepared without adding any supplementary antioxidant.
Example C2 was prepared by adding a conventional antioxidant system comprising AO1 and P1 in the amounts shown in Table 3.1.
Example IE1 contained additional P1 and P3.
Example IE2 contained additional P1 and P2.

TABLE 3.1

| Formulation | P3 (%) | AO1 (%) | P2 (%) | P1 (%) |
|---|---|---|---|---|
| C1 | 0 | 0 | 0 | 0 |
| C2 | | 0.0075 | | 0.03 |
| IE1 | 0.05 | | | 0.03 |
| IE2 | | | 0.05 | 0.03 |

The samples were exposed to elevated temperatures and oxygen.
Color data (Yellowness Index, or "YI") are reported in Table 3.2.

TABLE 3.2

Yellowness Index (YI) Measured on Plaques of the Various Blends

| Formulation | Color (YI) |
|---|---|
| C1 | 16.8 |
| C2 | 15.8 |
| IE1 | 16.3 |
| IE2 | 17.2 |

These same blends were also submitted for headspace testing (to analyze the composition of volatile products produced during extrusion) using the method described below.

Approximately 1.0 g of melt blend resin was weighed in a headspace hypo vial and heated to 220° C. for 10 minutes. The headspace was transferred onto the gas chromatography (GC) column and analyzed by gas chromatography mass spectroscopy (GCMS). The volatile organic compounds released by these samples at 220° C. were characterized using static headspace Gas Chromatography-Mass Spectrometry (HS-GC/MS).

Chromatographic profiles for these samples are very similar in composition, exhibiting a complex mix rich in oxygenated compounds, with several hydrocarbons.

Even though the volatile organic species released to the headspace at the conditions mentioned are mostly the same, there is a notable difference in concentration levels, where the volatiles released by sample C1 were much higher relative concentrations when compared to the other 3 samples, most notably IE2.

The resulting chromatograms can be seen overlaid in FIG. 1. It should be noted that the same amplitude scale was used to allow for graphic comparison.

The peaks area counts decreasing percentages, when comparing against the control sample, can be seen in Table 3.3.

Sample C2 that contains a conventional antioxidant blend demonstrates a modest reduction in total volatile species detected; whereas examples IE1 and IE2 demonstrate much more drastic reductions in total volatile species detected. IE1 similar to the stabilization package used in FP120-CN, results in a greater than 50% overall reduction in species detected when compared to the control (C1; without any additional antioxidant); and a 40% reduction over a conventional, antioxidant system containing a 4:1 ratio of P1 to AO 1 (C2). Surprisingly, the addition of supplemental amounts of P2 (IE2) resulted in a drastic reduction in species detected, with an ~85% reduction in overall volatile species detected when compared to the control blend.

Figure 2:
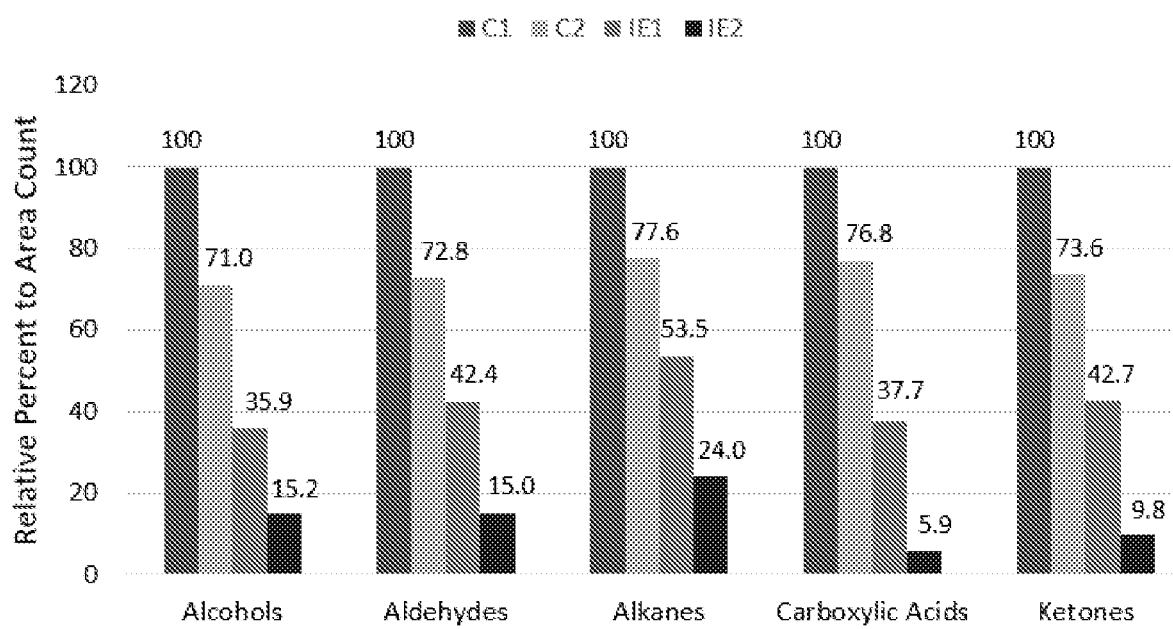
FIG. 2 is relative area counts for species detected by GC-MS headspace analysis at 220° C., grouped by chemical functionality.

FIG. 2 charts the relative percentage of chemical species detected via GC-MS headspace, grouped by chemical functionality.

TABLE 3.3

Relative Peak Area Counts as Compared to C1 as Reference for All Species Detected

| | | Relative Peak Area (%) | | | |
|---|---|---|---|---|---|
| Peak # | Compound Name | C1 | C2 | IE1 | IE2 |
| 1 | Formaldehyde | 100 | 70.5 | 10.4 | 8.4 |
| 2 | Acetaldehyde | 100 | 61.4 | 31 | 1.9 |
| 3 | Isobutane & Pentane | 100 | 77.5 | 48.5 | N/A |
| 4 | Ethanol | 100 | 69.1 | 32.2 | N/A |
| 5 | 2-Propenal | 100 | 77.1 | 33.9 | 12 |
| 6 | Acetone | 100 | 84.1 | 39.2 | 16.9 |
| 7 | Propanal | 100 | 73.6 | 37.7 | 30.5 |
| 8 | tert-Butyl Alcohol | 100 | 72.8 | 39.6 | 15.2 |
| 9 | Formic acid | 100 | 91.3 | 43.9 | 7.5 |
| 10 | Butanal & Hexane | 100 | 76.4 | 41.5 | 7.9 |
| 11 | Acetic Acid | 100 | 77.6 | 39 | 6.5 |
| 12 | Pentannone | 100 | 70.6 | 46.8 | 12 |
| 13 | Pentanal | 100 | 70.8 | 41.6 | 8.9 |
| 14 | Hexanone | 100 | 75.6 | 42.8 | 9.3 |
| 15 | Hexanal | 100 | 71.2 | 42.1 | 8.5 |
| 16 | Heptanone | 100 | 74.1 | 38.6 | 9.2 |
| 17 | Nonane | 100 | 74.5 | 40.9 | 5.6 |
| 18 | Heptanal | 100 | 74.3 | 46 | 10.4 |
| 19 | Butyrolactone | 100 | 70.9 | 43 | 7.5 |
| 20 | gamma-Methyl-Butyrolactone | 100 | 71.3 | 39.6 | 7.8 |
| 21 | Hexanoic acid | 100 | 75.4 | 44.3 | N/A |
| 22 | Octanone | 100 | 82.6 | 50.2 | 7.1 |
| 23 | Decane | 100 | 74.7 | 43 | 7.7 |
| 24 | Octanal | 100 | 80 | 53.5 | 13.8 |
| 25 | gamma-Ethyl-Butyrolactone | 100 | 70 | 40.1 | 8.1 |
| 26 | Heptanoic acid | 100 | 71.1 | 30.1 | N/A |
| 27 | Nonanone | 100 | 74 | 51.7 | 6.8 |
| | Undecane | 100 | 76.4 | 47.3 | 11 |
| | Nonanal | 100 | 75.9 | 48.5 | 17.1 |
| 28 | gamma-Propyl-Butyrolactone | 100 | 70.3 | 40.2 | 8.4 |
| | Octanoic acid | 100 | 68.7 | 31.4 | 3.6 |
| 29 | Decanone | 100 | 79.6 | 46.6 | 19.2 |
| | Dodecane | 100 | 86.1 | 66 | 43.4 |
| | Decanal | 100 | 70 | 45.1 | 10.5 |
| 30 | gamma-Butyl-Butyrolactone | 100 | 67.6 | 37.9 | 8.1 |
| 31 | Undecanone | 100 | 66.6 | 38.5 | 6.6 |
| | Tridecane | 100 | 65.5 | 38.5 | 6 |
| | Undecanal | 100 | 64.7 | 41.2 | 13.7 |
| 32 | Tetradecane | 100 | 96.7 | 80.9 | 60.3 |
| | Dedecanal | 100 | 68.9 | 43.8 | 14.1 |
| 33 | Pentadecane | 100 | 69.5 | 42.8 | 8.6 |
| | Tridecanal | 100 | 61.6 | 36.8 | 7.9 |
| 34 | Hexadecane & Tetradecanal | 100 | 95 | 83 | 59.8 |
| 35 | Eicosane | 100 | 77.3 | 73.4 | 49.6 |

INDUSTRIAL APPLICABILITY

Caps and closures made from a blend of recycled polyethylene and a virgin polyethylene composition

The invention claimed is:

1. A polyethylene blend comprising:
 from 1 wt. % to 50 wt. % recycled polyethylene; and
 from 50 wt. % to 99 wt. % of a bimodal polyethylene composition comprising:
  10 wt. % to 70 wt. % of a first ethylene copolymer having a melt index $I_2$, of less than 0.4 g/10 min; a molecular weight distribution, $M_w/M_n$, of less than 2.7; and a density from 0.920 g/cm$^3$ to 0.955 g/cm$^3$; and
  30 wt. % to 90 wt. % of a second ethylene copolymer having a melt index $I_2$, from 100 to 20,000 g/10 min; a molecular weight distribution $M_w/M_n$, of less than 2.7; and a density higher than the density of the first ethylene copolymer, but less than 0.967 g/cm$^3$;
 wherein the recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load from 0.3 to 30 g/10 minutes; and
 wherein the bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load from 0.1 to 12 g/10 minutes, and a B10ESCR as determined by ASTM D1693 from 10 to 2000.

2. The polyethylene blend of claim 1, wherein the density of the recycled polyethylene is from 0.930 g/cm$^3$ to 0.970 g/cm$^3$, as measured by ASTM D792.

3. The polyethylene blend of claim 1, wherein the density of the recycled polyethylene is from 0.952 g/cm$^3$ to 0.970 g/cm$^3$ as measured by ASTM D792.

4. The polyethylene blend of claim 1, wherein the melt index, $I_2$, of the recycled polyethylene as determined by ASTM D1238 at 190° C. using a 2.16 kg load is from 0.5 to 10 g/10 minutes.

5. The polyethylene blend of claim 1, wherein the melt index, $I_2$, of the recycled polyethylene as determined by ASTM D1238 at 190° C. using a 2.16 kg load is from 0.5 to 4 g/10 minutes.

6. The polyethylene blend of claim 1, wherein the density of the bimodal polyethylene composition is from 0.945 g/cm$^3$ to 0.966 g/cm$^3$ as measured by ASTM D792.

7. The polyethylene blend of claim 1, wherein the density of the bimodal polyethylene composition is from 0.949 g/cm$^3$ to 0.962 g/cm$^3$ as measured by ASTM D792.

8. The polyethylene blend of claim 1, wherein the melt index, $I_2$, of the bimodal polyethylene composition is between 0.2 to 7 g/10 min according to ASTM D1238, when conducted at 190° C., using a 2.16 kg weight.

9. The polyethylene blend of claim 1, wherein the melt index, $I_2$, of the bimodal polyethylene composition is between 0.3 to 4 g/10 min according to ASTM D1238, when conducted at 190° C., using a 2.16 kg weight.

10. The polyethylene blend of claim 1, wherein the B10 ESCR of the bimodal polyethylene composition as determined by ASTM D1693 is from 50 to 1000.

11. The polyethylene blend of claim 1, wherein the B10 ESCR of the bimodal polyethylene composition as determined by ASTM D1693 is from 100 to 600.

12. The polyethylene blend of claim 1, further comprising a hindered phenolic primary antioxidant additive.

13. The polyethylene blend of claim 1, further comprising tris (2-4-di-tert-butylphenyl) phosphite, 6-[3-(3-tert-butyl-4-hydroxy-5-methylphenyl) propoxy]-2,4,8,10-tetra-tert-butyldibenzo [d,f][1,3,2] dioxaphospepin, bis (2,4,6-tri-tert-butylphenyl) pentaerythritol diphosphite, and bis (2,4-dicumylphenyl) pentaerythritol diphosphate, or mixtures thereof.

14. The polyethylene blend of claim 1, wherein the first ethylene copolymer and the second ethylene copolymer are made using a single site catalyst.

15. The polyethylene blend of claim 1, wherein the first ethylene copolymer of the bimodal polyethylene composition has a density from 0.925 g/cm$^3$ to 0.950 g/cm$^3$.

16. The polyethylene blend of claim 1, wherein the second ethylene copolymer of the bimodal polyethylene composition has a density of less than 0.965 g/cm$^3$.

17. The polyethylene blend of claim 1, wherein the bimodal polyethylene composition has a density from 0.951 g/cm$^3$ to 0.960 g/cm$^3$.

18. The polyethylene blend of claim 1, wherein in the bimodal polyethylene composition the density of the second ethylene copolymer is less than 0.035 g/cm$^3$ higher than the density of the first ethylene copolymer.

19. The polyethylene blend of claim 1, wherein the bimodal polyethylene composition comprises: from 30 wt. % to 60 wt. % of the first ethylene copolymer; and from 40 wt. % to 70 wt. % of the second ethylene copolymer.

20. The polyethylene blend of claim 1, wherein the bimodal polyethylene composition further comprises a nucleating agent or a mixture of nucleating agents.

21. The polyethylene blend of claim 1, wherein in the bimodal polyethylene composition the first and second ethylene copolymers are copolymers of ethylene and 1-octene.

22. A molded article prepared from a polyethylene blend comprising:
from 1 wt. % to 50 wt. % recycled polyethylene; and
from 50 wt. % to 99 wt. % of a bimodal polyethylene composition comprising:
10 wt. % to 70 wt. % of a first ethylene copolymer having a melt index $I_2$, of less than 0.4 g/10 min; a molecular weight distribution, $M_w/M_n$, of less than 2.7; and a density from 0.920 g/cm$^3$ to 0.955 g/cm$^3$; and
30 wt. % to 90 wt. % of a second ethylene copolymer having a melt index $I_2$, from 100 to 20,000 g/10 min; a molecular weight distribution $M_w/M_n$, of less than 2.7; and a density higher than the density of the first ethylene copolymer, but less than 0.967 g/cm$^3$;
wherein the recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load from 0.3 to 30 g/10 minutes; and
wherein the bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load from 0.1 to 12 g/10 minutes, and a B10ESCR as determined by ASTM D1693 from 10 to 2000.

23. The polyethylene blend of claim 22, wherein the melt index, $I_2$, of the bimodal polyethylene composition is between 0.3 to 4 g/10 min according to ASTM D1238, when conducted at 190° C., using a 2.16 kg weight.

24. A cap prepared from a polyethylene blend comprising:
from 1 wt. % to 50 wt. % recycled polyethylene; and
from 50 wt. % to 99 wt. % of a bimodal polyethylene composition comprising:
10 wt. % to 70 wt. % of a first ethylene copolymer having a melt index $I_2$, of less than 0.4 g/10 min; a molecular weight distribution, $M_w/M_n$, of less than 2.7; and a density from 0.920 g/cm$^3$ to 0.955 g/cm$^3$; and
30 wt. % to 90 wt. % of a second ethylene copolymer having a melt index $I_2$, from 100 to 20,000 g/10 min; a molecular weight distribution $M_w/M_n$, of less than 2.7; and a density higher than the density of the first ethylene copolymer, but less than 0.967 g/cm$^3$;
wherein the recycled polyethylene has a density from 0.916 g/cm$^3$ to 0.970 g/cm$^3$ as measured by ASTM D792, and a melt index, $I_2$, as determined by ASTM D1238 at 190° C. using a 2.16 kg load from 0.3 to 30 g/10 minutes;
and wherein the bimodal polyethylene composition has a density from 0.930 g/cm$^3$ to 0.970 g/cm$^3$ as measured by ASTM D792, and a melt index, $I_2$, as determined by ASTM D1238 at 190° C. using a 2.16 kg load from 0.1 to 12 g/10 minutes, and a B10 ESCR as determined by ASTM D1693 from 10 to 2000.

* * * * *